United States Patent
Rytwo

(10) Patent No.: US 9,546,102 B2
(45) Date of Patent: Jan. 17, 2017

(54) METHOD FOR PRETREATMENT OF WASTEWATER AND RECREATIONAL WATER WITH NANOCOMPOSITES

(71) Applicant: Gavish-Galilee Bio Applications, Ltd., Kiryat Shmona (IL)

(72) Inventor: Giora Rytwo, Kiryat Shmona (IL)

(73) Assignee: GAVISH-GALILEE BIO APPLICATIONS LTD., Kiryat Shmona (IL)

( * ) Notice: Subject to any disclaimer, the term of this patent is extended or adjusted under 35 U.S.C. 154(b) by 233 days.

(21) Appl. No.: 13/967,644

(22) Filed: Aug. 15, 2013

(65) Prior Publication Data

US 2014/0042100 A1   Feb. 13, 2014

Related U.S. Application Data

(63) Continuation-in-part of application No. PCT/IL2012/000245, filed on Jun. 21, 2012.

(Continued)

(51) Int. Cl.

| B01D 21/01 | (2006.01) |
| C02F 1/52 | (2006.01) |
| C02F 1/56 | (2006.01) |
| B03D 3/00 | (2006.01) |
| C02F 1/00 | (2006.01) |
| C02F 101/10 | (2006.01) |
| C02F 101/16 | (2006.01) |
| C02F 101/34 | (2006.01) |

(Continued)

(52) U.S. Cl.
CPC ............. *C02F 1/5236* (2013.01); *B01D 21/01* (2013.01); *C02F 1/56* (2013.01); *C02F 1/5272* (2013.01); *C02F 2101/105* (2013.01); *C02F 2101/163* (2013.01); *C02F 2101/345* (2013.01); *C02F 2103/007* (2013.01); *C02F 2103/20* (2013.01); *C02F 2103/22* (2013.01); *C02F 2103/26* (2013.01); *C02F 2103/322* (2013.01); *C02F 2103/325* (2013.01); *C02F 2305/08* (2013.01)

(58) Field of Classification Search
None
See application file for complete search history.

(56) References Cited

U.S. PATENT DOCUMENTS

| 3,066,095 A | 11/1962 | Hronas |
| 5,433,865 A * | 7/1995 | Laurent ........................ 210/727 |

(Continued)

FOREIGN PATENT DOCUMENTS

EP   1870380 A1 *  12/2007  ................ C02F 1/52

OTHER PUBLICATIONS

G. Jock Churchman: "Formation of complexes between bentonite and different cationic polyelectrolytes and their use as sorbents for non-ionic and anionic pollutants"; Applied Clay Science 21; pp. 177-189. (2002).

(Continued)

*Primary Examiner* — Nam Nguyen
*Assistant Examiner* — Clare Perrin
(74) *Attorney, Agent, or Firm* — Browdy and Neimark, PLLC

(57) ABSTRACT

A single step pretreatment of wastewater or recreational water is provided comprising treatment with nanocomposites consisting of an anchoring particle such as a clay mineral and one or more polymers.

23 Claims, 24 Drawing Sheets
(19 of 24 Drawing Sheet(s) Filed in Color)

Related U.S. Application Data

(60) Provisional application No. 61/500,296, filed on Jun. 23, 2011.

(51) Int. Cl.

| | |
|---|---|
| C02F 103/00 | (2006.01) |
| C02F 103/20 | (2006.01) |
| C02F 103/22 | (2006.01) |
| C02F 103/26 | (2006.01) |
| C02F 103/32 | (2006.01) |

(56) References Cited

U.S. PATENT DOCUMENTS

| | | | |
|---|---|---|---|
| 2005/0258103 A1* | 11/2005 | Cort | 210/695 |
| 2007/0172913 A1* | 7/2007 | Hughes et al. | 435/41 |
| 2009/0206040 A1* | 8/2009 | Berg et al. | 210/728 |

OTHER PUBLICATIONS

Ganigar et al: "Polymer-clay nanocomposites for the removal of trichlorophenol and trinitrophenol from water"; Applied Clay Science 49; pp. 311-316. (2010).

S. M. Mousavi et al:"Use of Modified Bentonite for Phenolic Adsorption in Treatment of Olive Oil Mill Wastewater"; Iranian Journal of Science & Technology, Transaction B, Engineering, vol. 30, No. B5: pp. 613-619 (2006).

Giora Rytwo; "The Use of Clay-Polymer Nanocomposites in Wastewater Pretreatment"; The ScientificWorld Journal vol. 2012; pp. 1-7. (2011).

Rytwo et al: "Use of CV- and TPP-montmorillonite for the removal of priority pollutants from water"; Applied Clay Science 36 ; pp. 182-190. (2007).

Rytwo et al: "Organo-sepiolite particles for efficient pretreatment of organic wastewater: Application to winery effluents"; Applied Clay Science 51; pp. 390-394. (2011).

Rytwo et al: "Very fast sorbent for organic dyes and pollutants"; Colloid Polym Sci 284; pp. 817-820 (2006).

Zadaka et al: Atrazine removal from water by polycation-clay composites: Effect of dissolved organic matter and comparison to activated carbon; Water Research 43; pp. 677-683. (2009).

Total Organic Carbon, On line Analysis of organic in water, pp. 1-6, Teledyne Analytical Instruments (2015).

Zimmels et al., Removal of high organic loads from winery wastewater by aquatic plants, Water Environ Res., 80 (9):806-22 (2008).

Masi et al., Winery high organic content wastewater treated by constructed wetlands in Mediterranean climate, Conference Proceedings of the IWA 8thInternational Conference on Wetland Systems for Water Pollution Control, Arusha (TZ), vol. 1, 274-282 (2002).

Rytwo and Malka, "A pilot plant for the treatment of cowshed effluents" Water & Irrigation, 530:6-9 (Sep.-Oct. 2013).

Dharmappa et al., Wastewater characteristics, management and reuse in mining & mineral processing industries, Encyclopedia of Life Support Systems (EOLSS), vol. I, pp. 1-10 (2002-2011).

Rytwo, et al., "Three unusual techniques for the analysis of surface modification of clays and nanocomposites" in: Beall, G., Powell, C.. (Eds.), Clays Minerals Society Workshop Series vol. 20 "Surface Modification of Clays and Nanocomposites." Clay Mineral Society, Boulder, CO, pp. 1-16 (2016).

Rytwo, et al., "Direct Relationship Between Electrokinetic Surface-charge Measurement of Effluents and Coagulant Type and Dose" Colloids Interface Sci. Commun. 1:27-30 (2014).

Rytwo, et al., "Clarification of olive mill and winery wastewater by means of clay-polymer nanocomposites" Sci. Total Environ. 442:134-142 (2013).

Von Homeyer et al., "Optimization of the polyelectrolyte dosage for dewatering sewage sludge suspensions by means of a new centrifugation analyser with an optoelectronic sensor" Colloid Polym. Sci. 277, 637-645 (1999).

\* cited by examiner

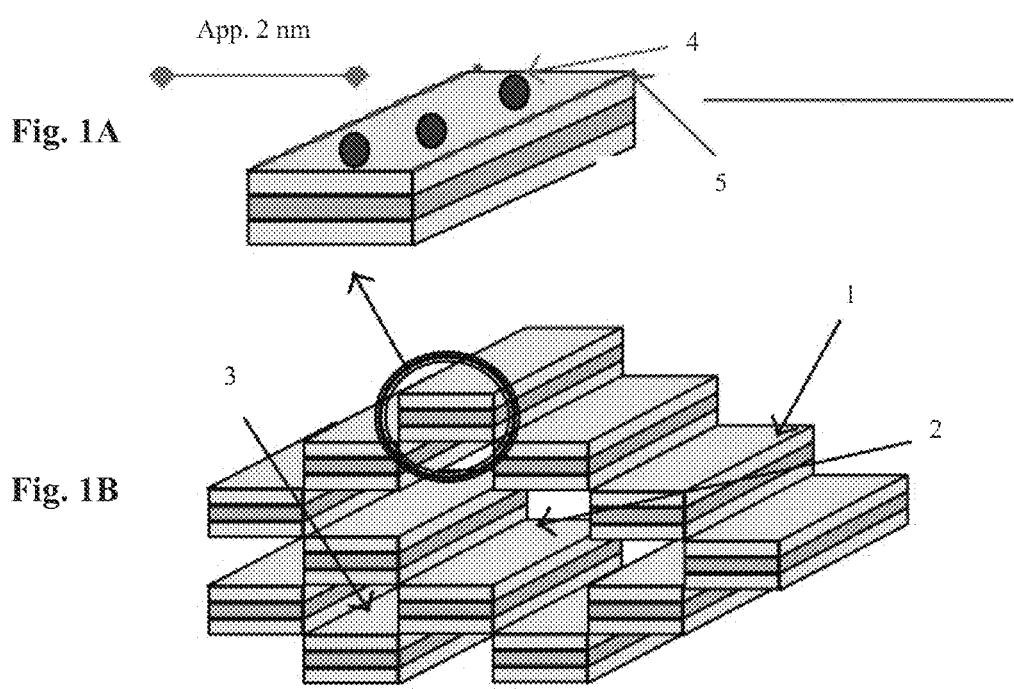

METHOD FOR PRETREATMENT OF WASTEWATER AND RECREATIONAL WATER WITH NANOCOMPOSITES

The present application is a continuation-in-part of International Application No. PCT/IL2012/000245, filed Jun. 21, 2012, in which the United States is designated, and is a non-provisional of the Provisional Application No. 61/500,296, filed Jun. 23, 2011, the entire contents of each and all these applications being hereby incorporated by reference herein in their entirety as if fully disclosed herein.

FIELD OF THE INVENTION

The present invention relates to treatment of wastewater or recreational water with a high organic load. In particular, it relates to a method for pretreatment of wastewater or recreational water using nanocomposites.

BACKGROUND OF THE INVENTION

There is an urgent need to process specific industrial or agricultural effluents (such as olive mills, wineries, piggeries, soy or coffee bean industries) that are unsuitable for discharge into standard sewage treatment plants due to the large amounts of organic and suspended matter. The disposal of such effluents without any treatment is known to cause serious environmental problems. Wineries are major producers of organically laden wastewater, yielding about 1000-3000 L per ton of grapes characterized by high contents of organic material and nutrients, high acidity, and large variations in seasonal flow production. The very high values of organic matter, suspended solids, and sodium adsorption ratio (SAR) make such water inadequate for disposal in common sewage systems.

Colloidal particles that tend to clog filtering devices are one of the problems with such effluents, in most cases, colloidal stability the colloids' tendency to remain dispersed) of the effluents is due to the fact that the particles are very small and in most effluents are negatively charged, thus, the mutual repulsion threes keep the particles in suspension. In several cases pretreatment processes in wastewater involve use of chemicals for the neutralization, flocculation, and precipitation of those colloids. In most cases such treatments are based on two separate stages: (a) neutralization of the charges (a step industrially known as "coagulation") and (b) bridging between several relatively small particles to form larger aggregates that, due to their size and density, sink at the bottom of the vessel, leaving a clarified effluent (step known as "flocculation").

Such destabilization of the colloidal suspension, inducing flocculation of large amount of suspended matter, lowers values of total suspended solids (TSS), turbidity, and even the chemical oxygen demand (COD). This, in turn, improves the efficiency of following water treatments, thereby reducing environmental hazard.

Clays and organoclays (clay minerals treated with organocations) have been widely used for the pretreatment of effluents (Amuda and Amoo, 2007; Beall, 2003). Combination of clay minerals and organic compounds efficiently removed colloidal solids in paper mill wastewater. Several studies used cationic or anionic polyelectrolytes, combinations of coagulants and polyelectrolytes, or even combination of clay minerals and organic quaternary ammonium ions (Mousavi et al., 2006) for the removal of organic contaminants from olive mill wastewater. In all cases, considerable changes in the colloidal properties of the effluent, including reduction in turbidity, TSS, COD and other quality parameters was achieved.

U.S. Pat. No. 6,447,686 discloses a high speed coagulant-flocculant and sedimentation method for treating waste water. The method is based on an arrangement of tanks comprising a mixing tank, an agitating tank, a polymer aggregation tank and a sedimentation tank successively connected, wherein the mixing tank comprises an aggregating agent which is based on clay minerals.

The term "nanoparticle" is usually used for a combined material which has at least on one dimension a size of 100 nm or less. Thus, most clay minerals are considered nanoparticles. The use of clays as building-blocks for assembling organic species at the nanometer range yields useful hybrid nanostructured materials. Nanocomposite materials consisting of polymer molecules and natural or layered minerals like clays can be prepared and designed by the combination of clay minerals with organic polymers interacting at the molecular level (Ruiz-Hitzky, 2001).

In previous studies, we demonstrated the ability of suitable nanoparticles for very efficient removal of phenolic compounds similar to components of olive mill or winery wastewater (Rytwo et al., 2007). Other studies (Rytwo et al., 2011) presented a very effective pretreatment based on combination of organoclay nanoparticles and crude clay, which changed the colloidal stability of winery and pickle industry effluents, reducing TSS and turbidity for several cycles by means of a two-step process: a first step performed with organoclay, and a second step performed by adding raw clay. In general, Rytwo et al (2011) process was similar to that used nowadays in the industry: (a) a coagulation step, performed in industry with cationic polymers, or with aluminium sulphate or other inorganic polycations Rytwo et al (2011), the coagulant was based on an organoclay), and (b) a flocculation step performed in the industry with flocculants in several cases based on cationic or anionic polyacrylamide derivatives (in Rytwo et al (2011), the flocculant was a raw clay mineral),

SUMMARY OF INVENTION

It has now been found, in accordance with the present invention, that by using nanocomposites comprised of an anchoring particle and one or more polymers as "coagoflocculants", a very rapid and efficient pretreatment of wastewater with a high organic load can be achieved in one single treatment step, contrary to the known two-step process used nowadays.

The present invention thus relates to a method for pretreatment of wastewater or recreational water with high organic load for reduction of total suspended solids (TSS), chemical oxygen demand (COD) and turbidity, wherein the method comprises the treatment in one single step of the wastewater or recreational water with a nanocomposite consisting of an anchoring particle and one or more polymers, at least one of said polymers being a polyelectrolyte polymer, whereby neutralization of charged colloidal particles suspended in the wastewater or recreational water occurs while bridging between them and anchoring them to the anchoring particles, thus enhancing their aggregation and precipitation and achieving a substantial reduction of TSS and turbidity in a very short time.

The neutralization/coagulation of the charged colloidal particles suspended in the wastewater or recreational water is achieved by the charged sites of the at least one polyelectrolyte polymer and bridging between the thus neutralized particles is achieved by the chains of said one or more polymers while anchoring them to the denser anchoring particles.

The anchoring particles may be clay minerals, non-clay minerals, diatomaceous earth or powdered activated carbon.

In certain embodiments, the anchoring particle is a clay mineral such as an aluminium or magnesium phyllosilicate that may be selected from sepiolite, palygorskite, smectite, montmorillonite, hectorite, laponite, bentonite, saponite and the like. In certain embodiments, the clay mineral is sepiolite or bentonite.

According to other certain embodiments, the anchoring particles are non-clay minerals such as zeolites. According to other certain embodiments, the anchoring particles consist of diatomaceous earth (diatomite or kieseiguhr) or of powdered activated carbon.

The polyelectrolyte polymer for use according to the invention can be a polycationic or polyanionic polymer. Examples of polycationic polymers for use herein include, but are not limited to: (i) a linear water-soluble polymer such as polydiallyl-dimethylammonium chloride (herein PD, poly-DADMAC or PDADMAC) and cationic polyacrylamide; (ii) a polyquaternium having quaternary ammonium centers in the polymer such as quaternized hydroxyethylcellulose ethoxylate (Polyquaternium 10) and poly [(2-ethyidimethylammonioethyl methacrylate ethyl sulfate)-co-(1-vinylpyrrolidone)] (Polyquaternium 10): (iii) cationic biopolymers such as cationic guar gum and chitosan; and (iv) polymers with aromatic rings such as poly-4-vinylpyridine-co-styrene and other styrene-based cationic copolymers. Examples of polyanionic polymers for use herein include, but are not limited to, poly(methyl vinyl ether-alt-maleic anhydride) (PNIVE) copolymer, poly(acrylamide-co-acrylic acid) (PAM) copolymer, polysulfonates, and natural anionic polymers such as carrageenans.

The method according to the invention is suitable for pretreatment of wastewater or recreational water with a high organic load or large amounts of algae. The wastewater may be from olive oil mill, wineries, piggeries, cowsheds, dairy effluents, slaughterhouses, fruit and vegetable processing industry, or soy or coffee bean industry, and the recreational water may be coastal or fresh water such as a coastal beach, lake, river or pond.

In certain embodiments, the substantial reduction of TSS is of two orders of magnitude and the short time is within the range of minutes to tens of minutes.

In certain embodiments the method of the present invention is carried out with a mixture of a nanocomposite and a bridging polymer with the same charge of the nanocomposite. The bridging polymer may be a branched polymer with long and slightly charged branches. Examples of bridging polymers for use herein include, but are not limited to acrylamide/dimethylaminoethylacrylate methyl chloride copolymers (AM-co-DMAEA) or similar copolymers such as commercial Zetagt® 8848FS (BASF®) or CT640® (SNF®).

BRIEF DESCRIPTION OF THE FIGURES

The patent or application file contains at least one drawing executed in color. Copies of this patent or patent application publication with color drawings will be provided by the Office upon request and payment of the necessary fee.

In the figures and their description below, the following abbreviations are used.

Figure 2A:
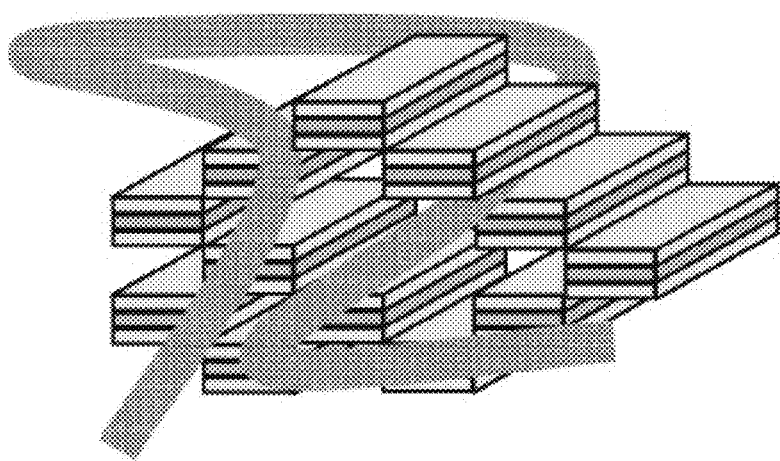

Abbreviations: AM-co-DMAEA, acrylamideidimethyl-aminoethylacrylate methyl chloride polymer; BR, bridging polymer; NC, PD-S9 or poly-DADMAC-sepiolite nanocomposite; NV, poly-DADMAC-bentonite nanocomposite; NH, chitosan-sepiolite nanocomposite; OMW, olive oil mill wastewater; poly-DADMAC, Pt), PDADMAC, polyallyl dimethylamtnonium chloride; PAM, poly(acrylamide-co-acrylic acid) copolymer; PMVE, poly(methylvinyl ether-alt-maleic anhydride) copolymer; S9, sepiolite; WE, winery effluents; WW, winery wastewater.

FIGS. 1A-1B show schematic structures of a single block and connected blocks, respectively, of sepiolite comprising silicate block (1), structural defect (2), zeolitic channel (3), charged sites (4), and neutral sites (5). The 2 nm size bar is given as a relative dimension.

Figure 2B:
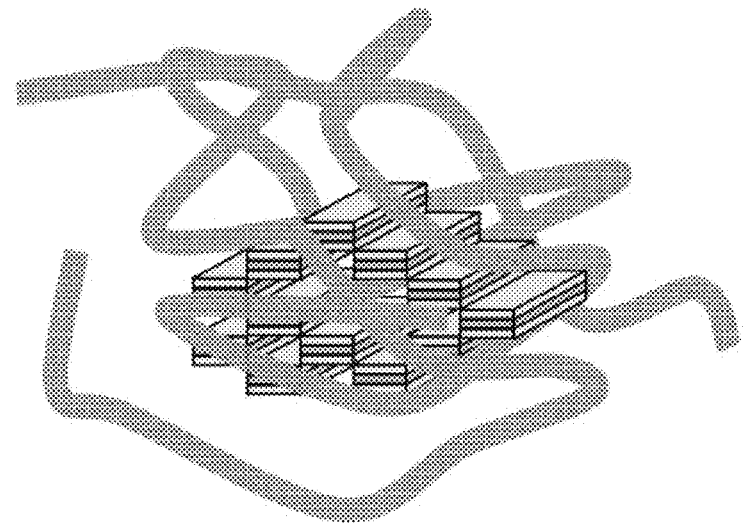

FIGS. 2A-2B show schematic structures of a low-charge nanocomposite suitable for winery effluents (A) and a high-charge nanocomposite suitable for olive mill effluents (B). The ribbons illustrate the polymer chains with positive charges distributed throughout.

Figure 3:
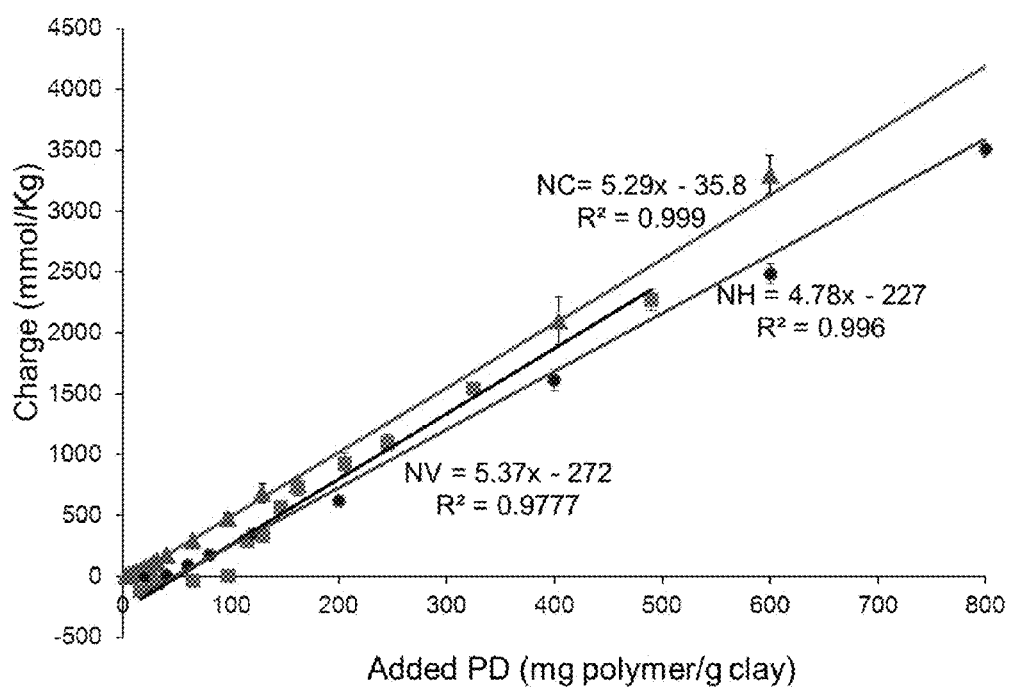

FIG. 3 is a graph depicting charge of the nanocomposites as a function of the amount of polymer in mg/g of clay. ▲—poly-DADMAC-sepiolite nanocomposites; ■poly-DADMAC -bentonite nanocomposites; and ●—chitosan-sepiolite nanocomposites.

Figure 4:
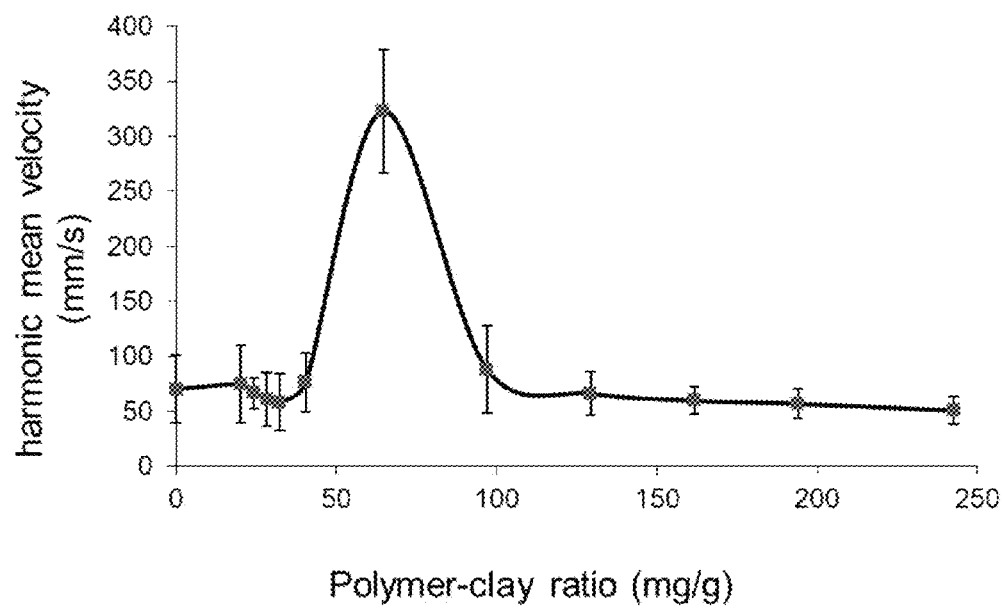

FIG. 4 is a graph depicting the harmonic mean sedimentation velocity of winery wastewater upon addition of 0.1% poly-DADMAC-sepiolite nanocomposite as a function of the polymer/clay ratio.

Figure 5:
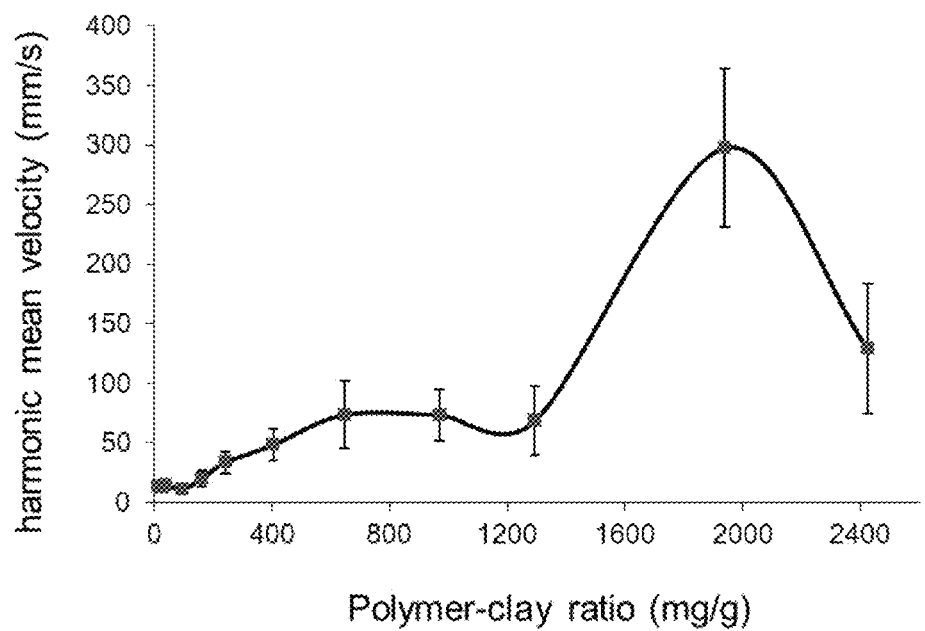

FIG. 5 is a graph depicting the harmonic mean sedimentation velocity of olive oil mill wastewater upon addition of 0.1% poly-DADMAC-sepiolite nanocomposite as a function of the polymer/clay ratio.

Figure 6:
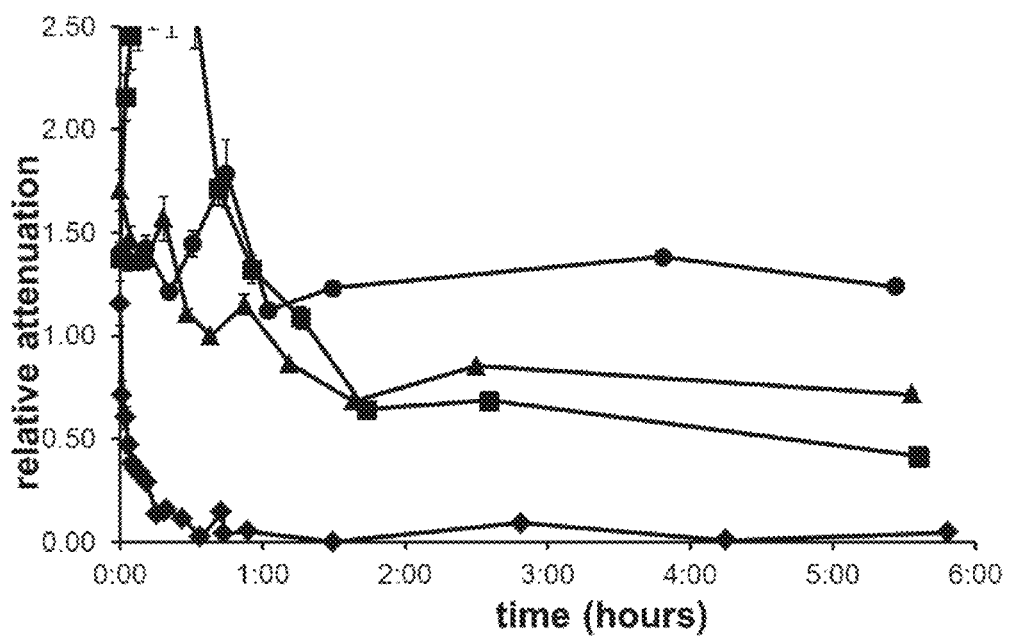

FIG. 6 is a graph depicting relative light attenuation of winery effluents as a function of time, upon addition of 0.1% alum (■), 0.1% poly-DADMAC-sepiolite nanocomposite (♦), and the equivalent amounts of sepiolite (clay) (▲) or poly-DADMAC (polymer), separately (●).

Figure 7A:
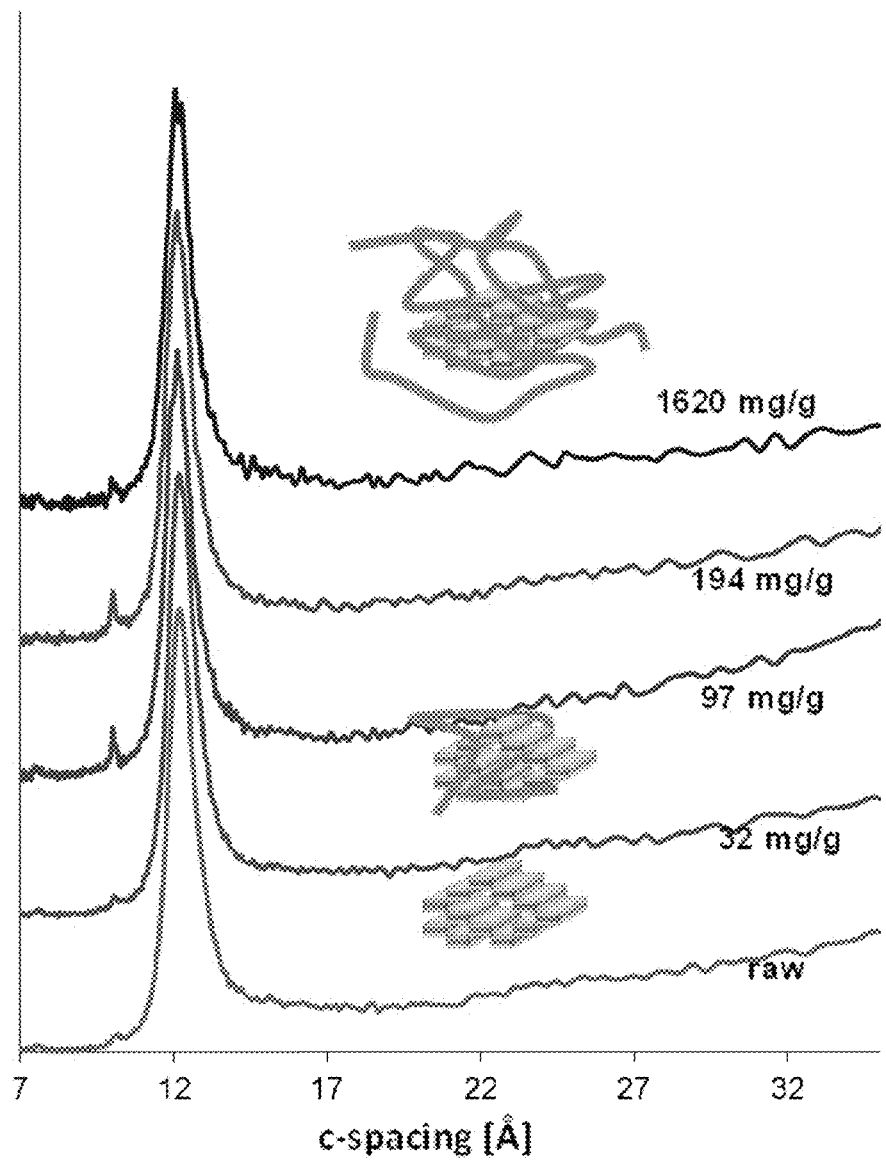
Figure 7B:
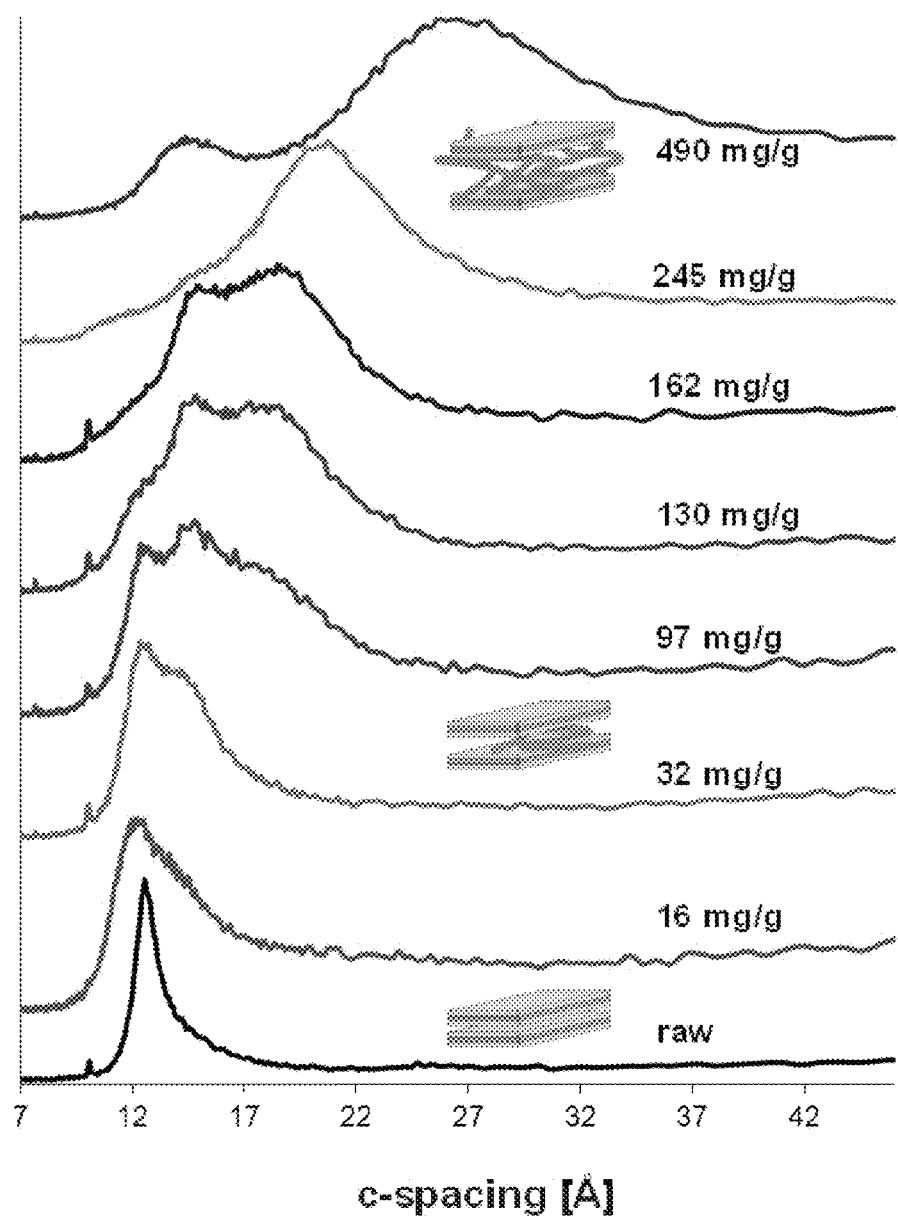

FIGS. 7A-7B are graphs depicting the influence of the amount of added poly-DADMAC in mg/g clay, to the c-spacing of the structure of sepiolite S9 (7A) or bentonite (7B). In FIG. 7A, the bottom curve represents the raw sepiolite S9, while the curves above it represent addition of 32 mg, 97 mg, 194 mg, or 1620 mg polymer per gram clay, respectively. In FIG. 7B, the bottom curve represents the raw bentonite, while the curves above it represent addition of 16 mg, 32 mg, 97 mg, 130 mg, 162 mg, 245 mg or 450 mg polymer per gram clay, respectively.

Figure 8:
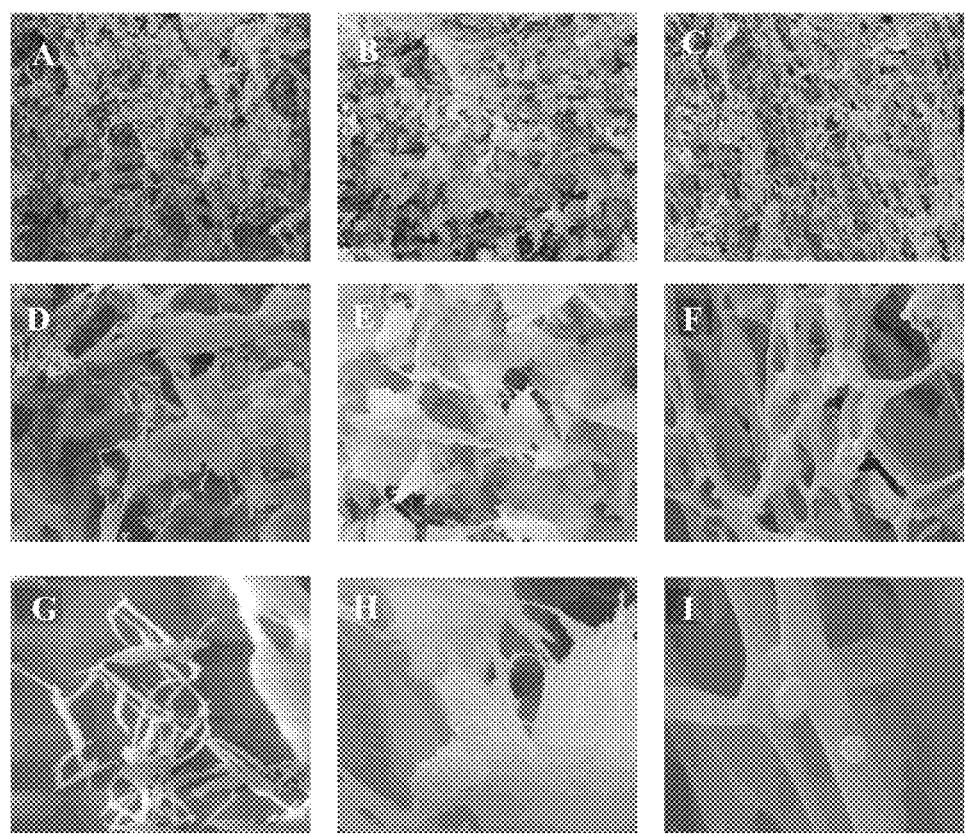

FIG. 8 (panels A-I) shows environmental scanning electron microscope images of two incorporated amounts of poly-DADMAC (32 mg/g: panels B, E, H; and 1620 mg/g: panels C, F, I) on sepiolite S9 fibers, compared with the raw mineral (panels A, D, G). Three levels of magnifications: ×1000 (panels A, B and C), ×5000 (panels D, E and F), ×20000 (panels C, H and I), are presented.

Figure 9:
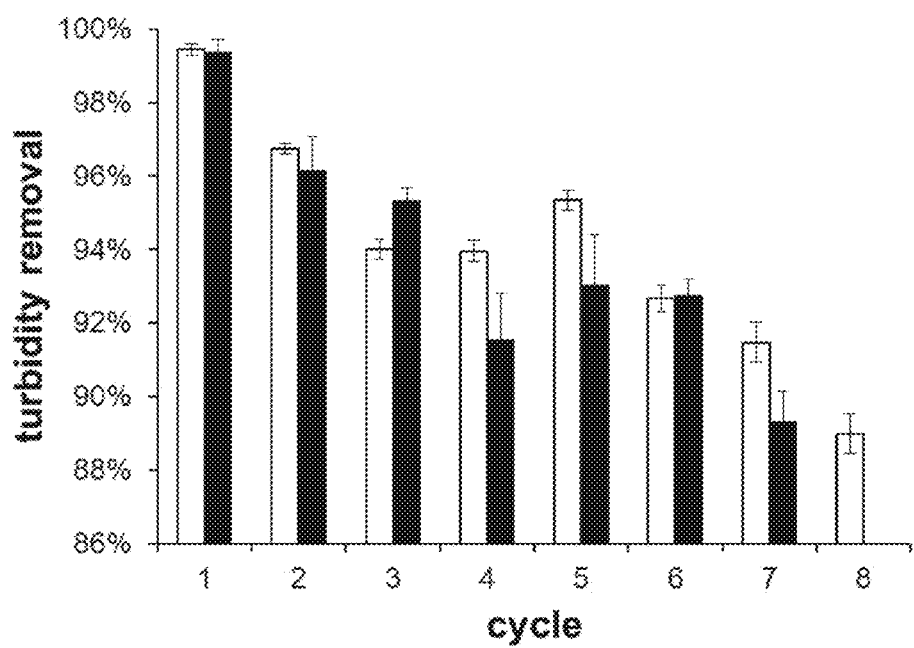

FIG. 9 is a graph depicting relative turbidity removal for OMW (white bars) and WE (black bars) wastewater, following cycles of consecutive additions of effluents and a low boosting dose of poly-DADMAC-sepiolite nanocomposites (Example 9).

Figure 10A:
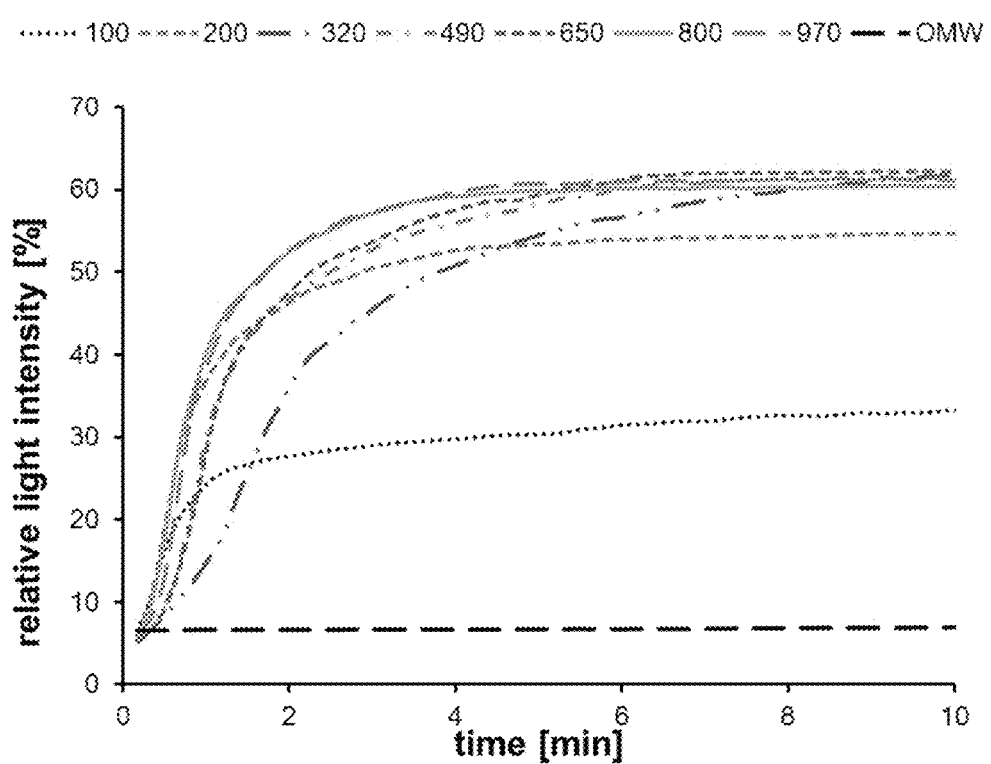
Figure 10B:
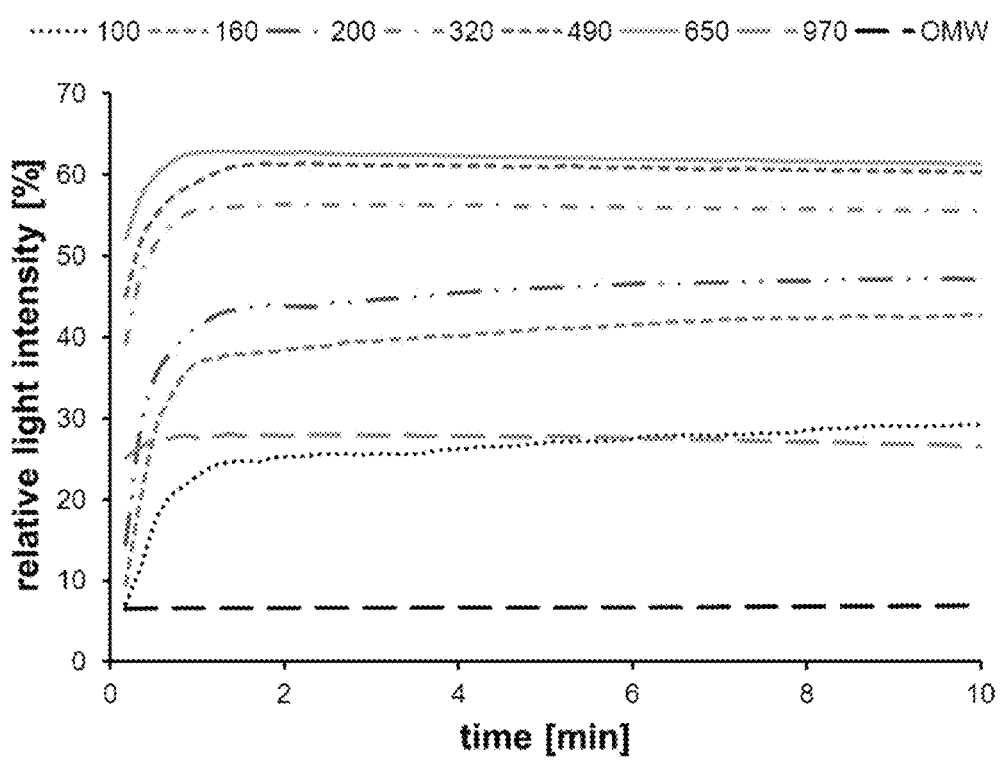
Figure 11A:
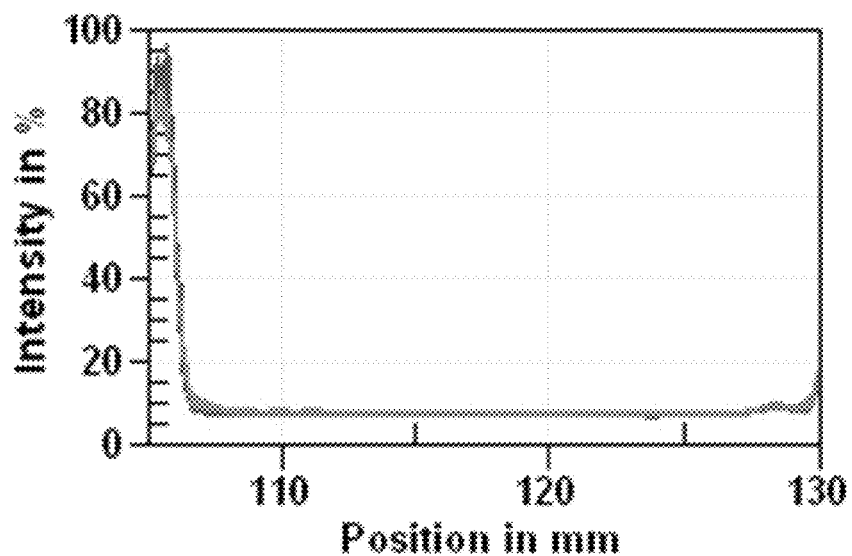
Figure 11B:
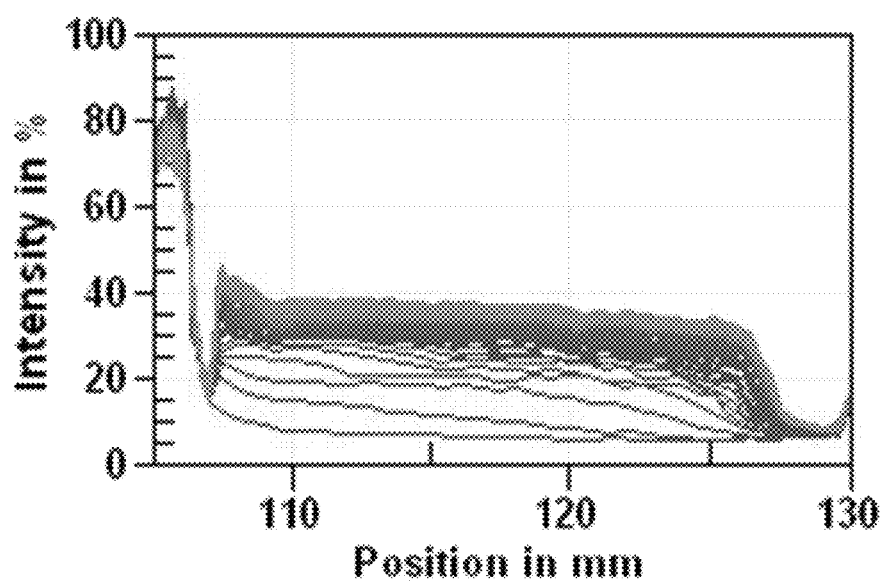
Figure 11C:
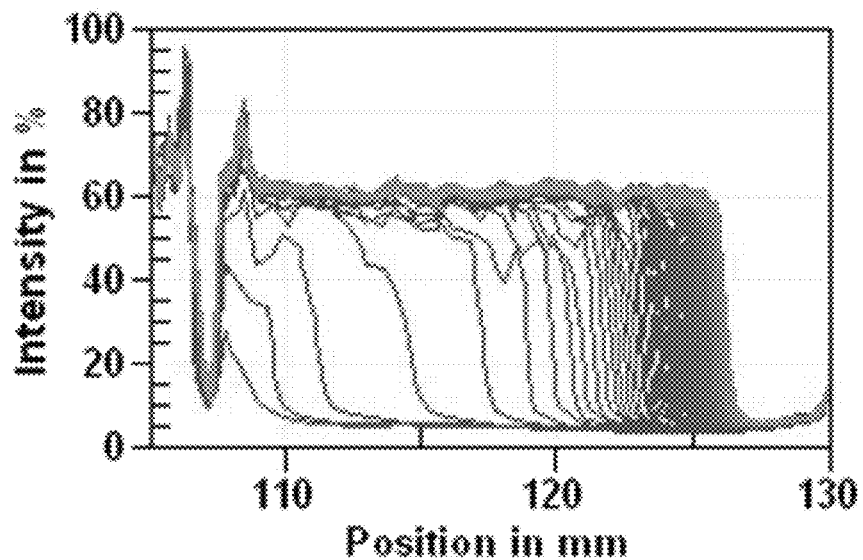
Figure 11D:
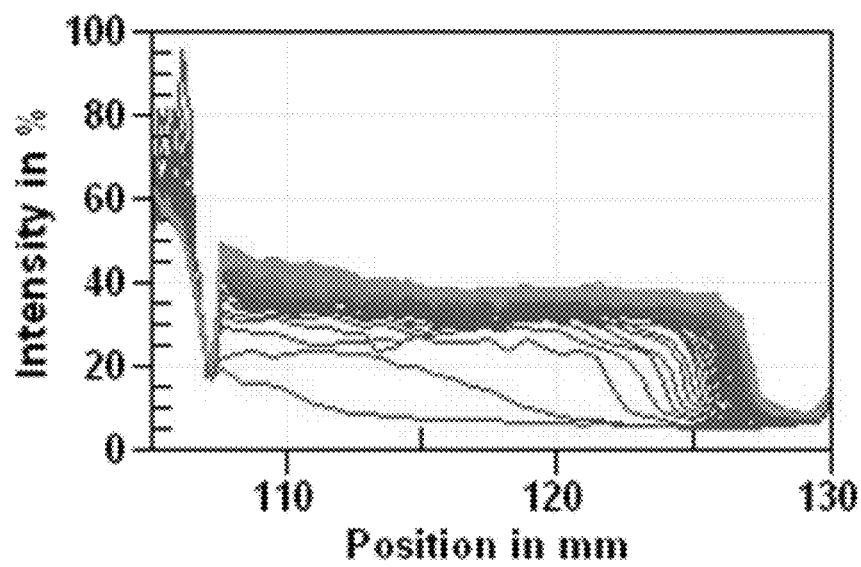
Figure 11E:
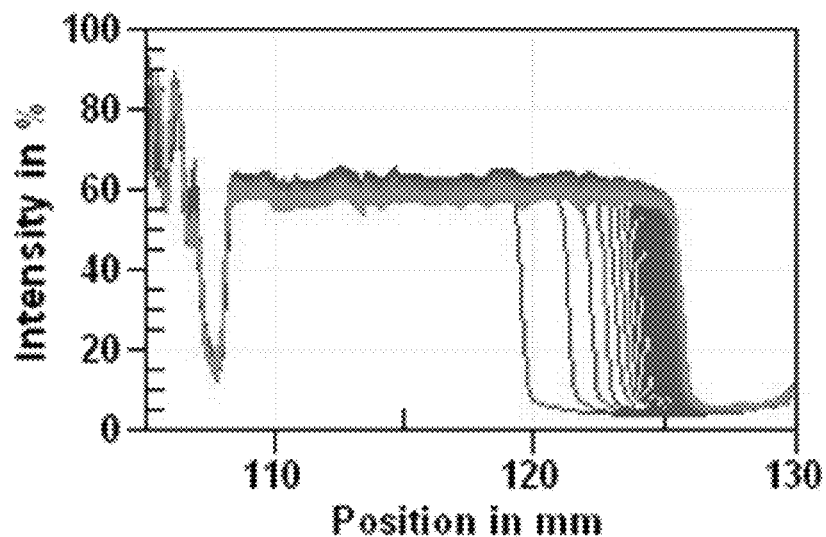
Figure 11F:
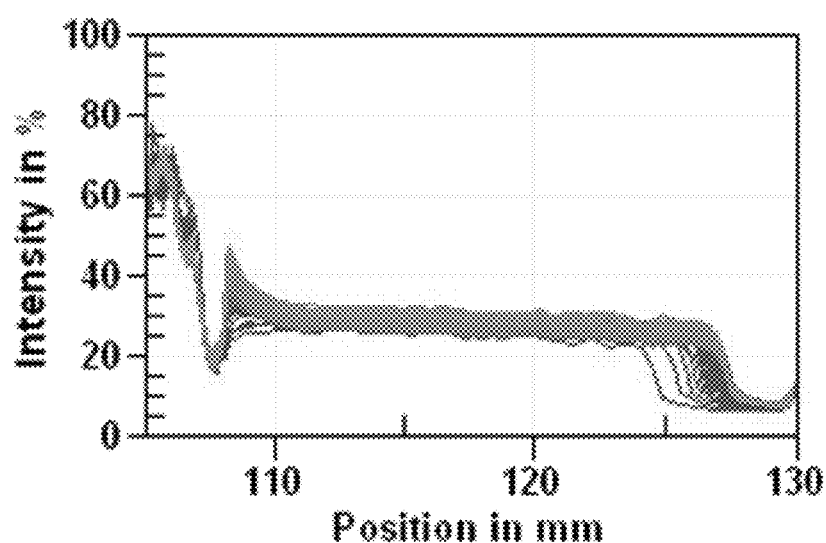

FIGS. 10A-10B are graphs depicting relative light intensity trough the upper part of a test tube as a function of time (in minutes) for olive mill wastewater (OMW) treated with NC (10A) or NH (10B) nanocomposites added at a 1 g/L clay dose. Centrifugation was performed at a centrifugal force equivalent to 32.8 g.

FIGS. 11A-11F are graphs depicting recorded evolution (from left to right) of time dependent transmission profiles of raw OMW sample (11A), nanocomposites with 100 mg poly-DADMAC/g sepiolite (11B) or 800 mg poly-DADMAC/g sepiolite (11C), and nanocomposites with 120 mg chitosan/g sepiolite (HD), 600 mg chitosan/g sepiolite (11E), and 1000 mg chitosan/g sepiolite (11B). Profiles were taken every 10 s at a RCF of 32.8 g (500 rpm) (Example 10).

Figure 12A:
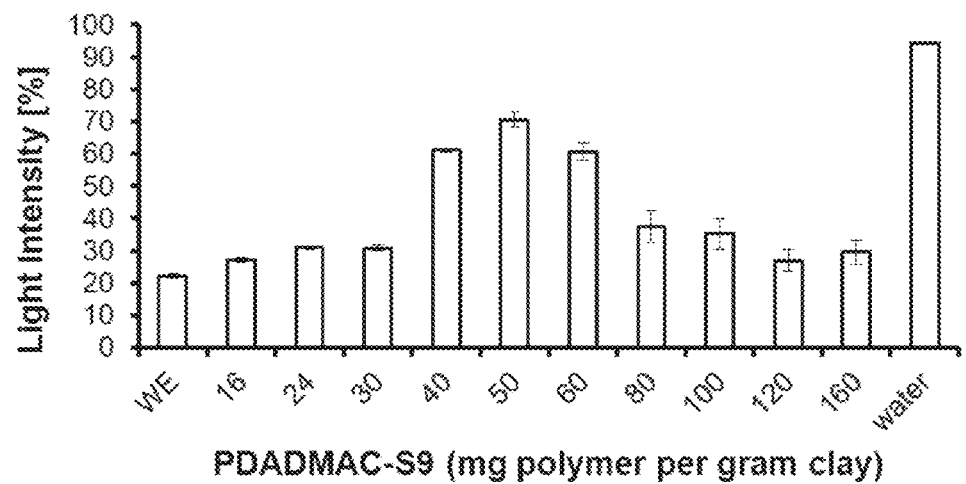
Figure 12B:
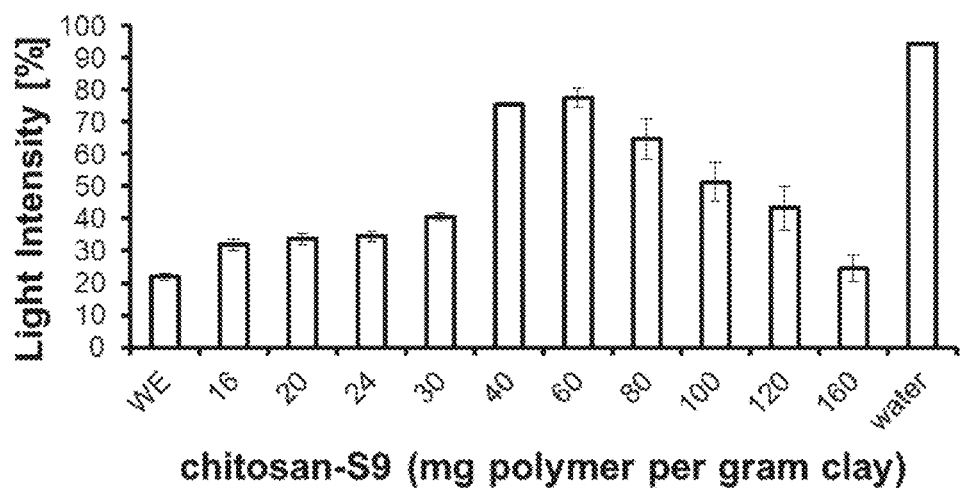
Figure 12C:
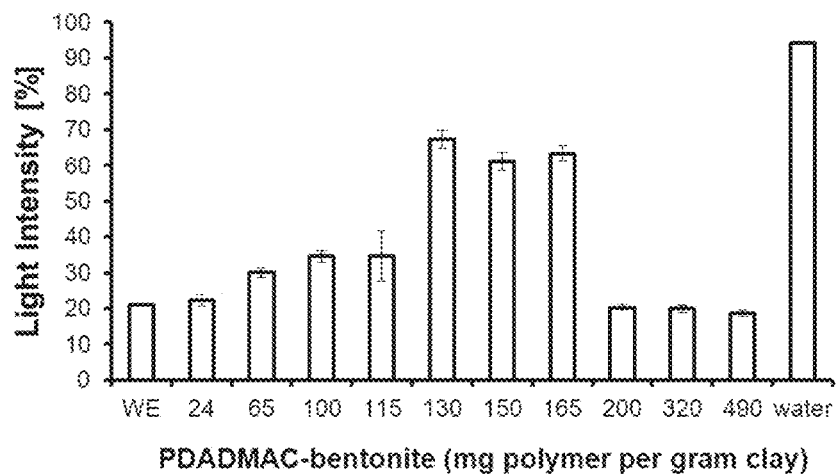

FIGS. 12A-12C are graphs depicting average light intensity measured between 1 and 3 minutes each 10 seconds, through the upper part of a test tube, for WE treated with poly-DADMAC-sepiolite (12A); chitosan-sepiolite (12B) or poly-DADMAC-bentonite (12C) nanocomposites added at a 1 g/L clay dose at different polymer/clay ratios. Centrifugation was performed at a centrifugal force equivalent to 5.2 g (Example 11).

Figure 13:
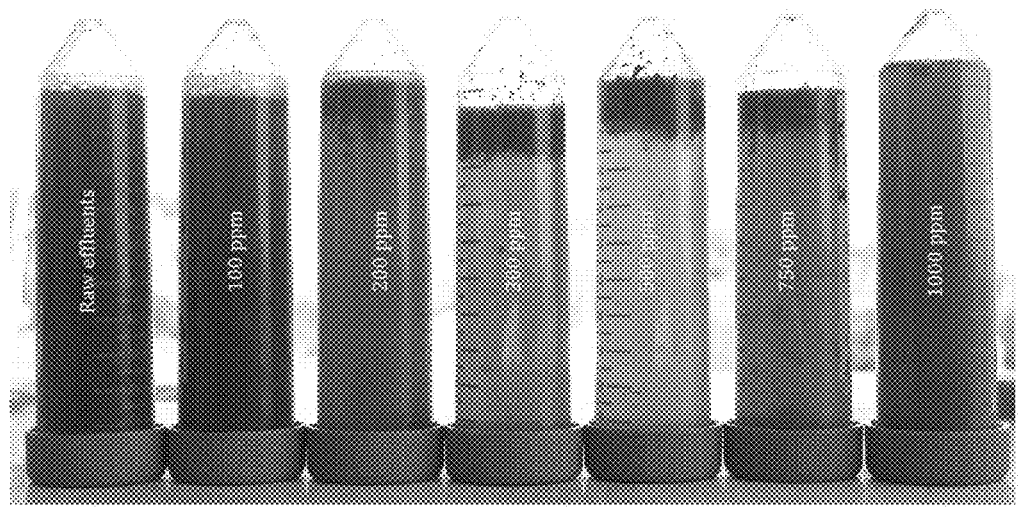

FIG. 13 is a picture of Mhrar OMW treated with increasing amounts of NC21 2.5% nanocomposites suspension, after 10 minutes of coagoflocculant addition (Example 13).

Figure 14:
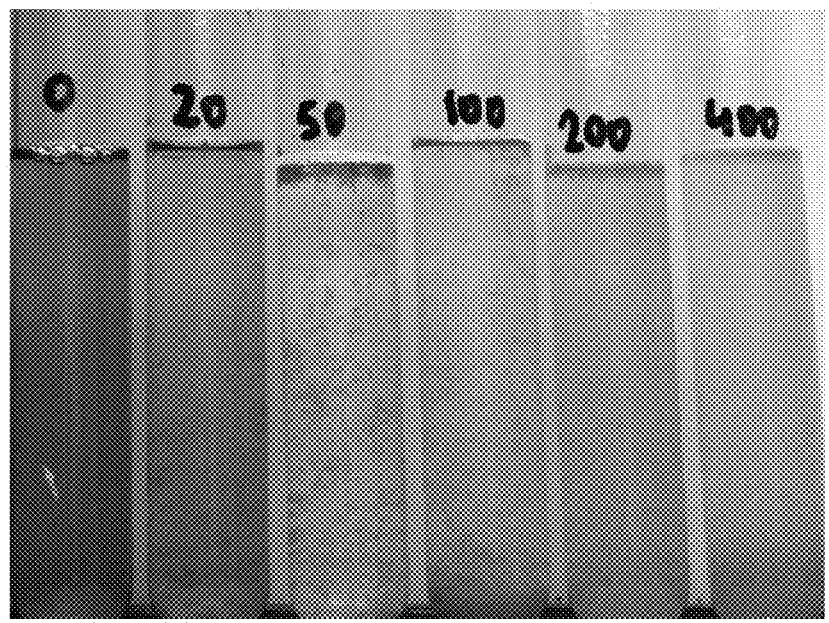

FIG. 14 is a picture of algae effluents treated with increasing amounts of NC21 2.5% nanocomposites suspension, after 10 minutes of coagoflocculant addition (amounts as ml per 50 ml effluents) (Example 13).

Figure 15:
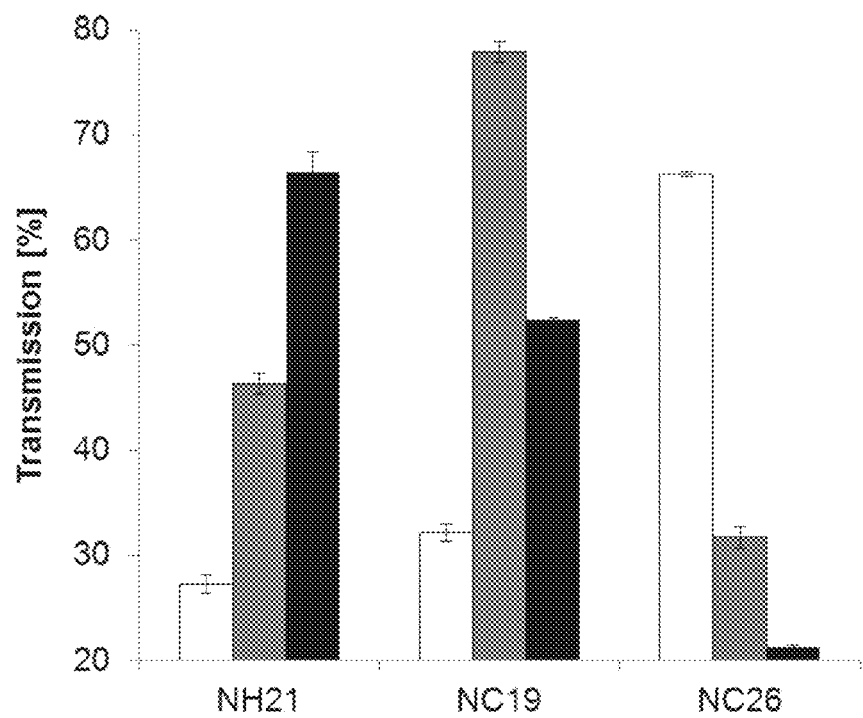

FIG. 15 shows a light, transmission of OMW after 2 min centrifugation, with doses of 8 (white bars), 40 (gray bars) or 80 (black bars) mL L$^{-1}$ of three different 2.5% nanocomposite suspensions (Example 13).

Figure 16:
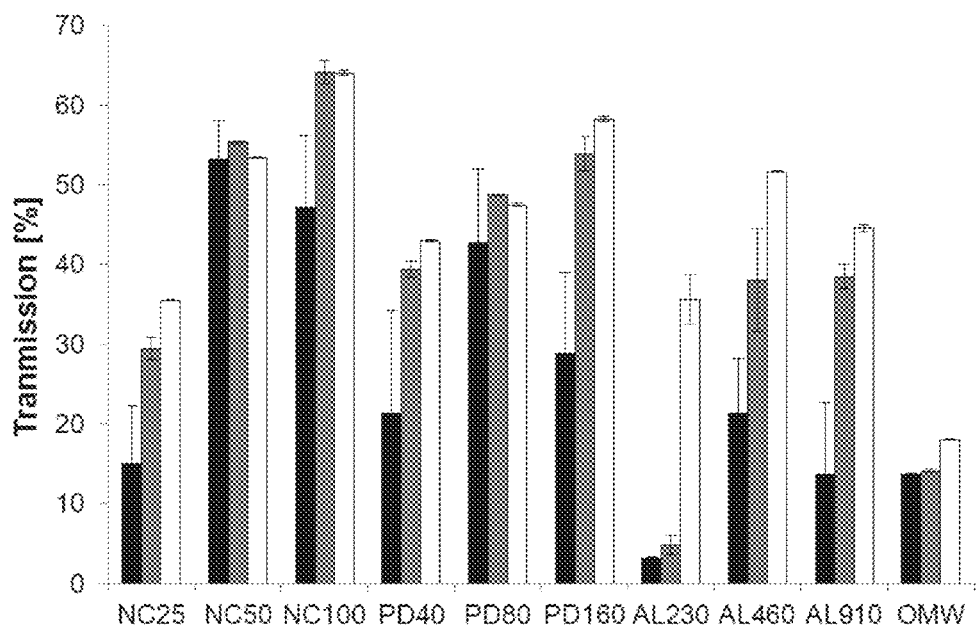

FIG. 16 shows a clarification of OMW by means of nanocomposites (NC 26), poly-DADMAC (PD) and alum sulfate (AL) at doses equivalent to 40%, 80% and 160% of the needed for neutralization. Numbers in the x-axis indicate the volume of the added compound in μL per 10 mL. Black bars represent transmission/clarification after 1 min of centrifugation; gray bars represent transmission/clarification after 3 min of centrifugation; and white bars represent transmission/clarification after 10 min of centrifugation (Example 13).

Figure 17:
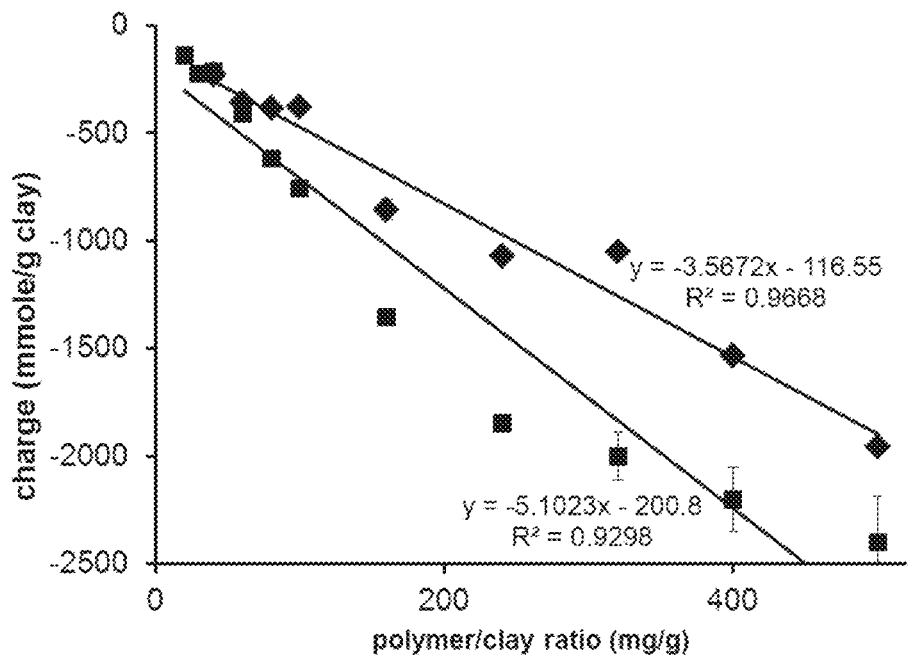

FIG. 17 shows a correlation between the charge and the polymer clay ratio or PMVE (♦) and PAM (■) anionic nanocomposites (Example 14).

Figure 18:
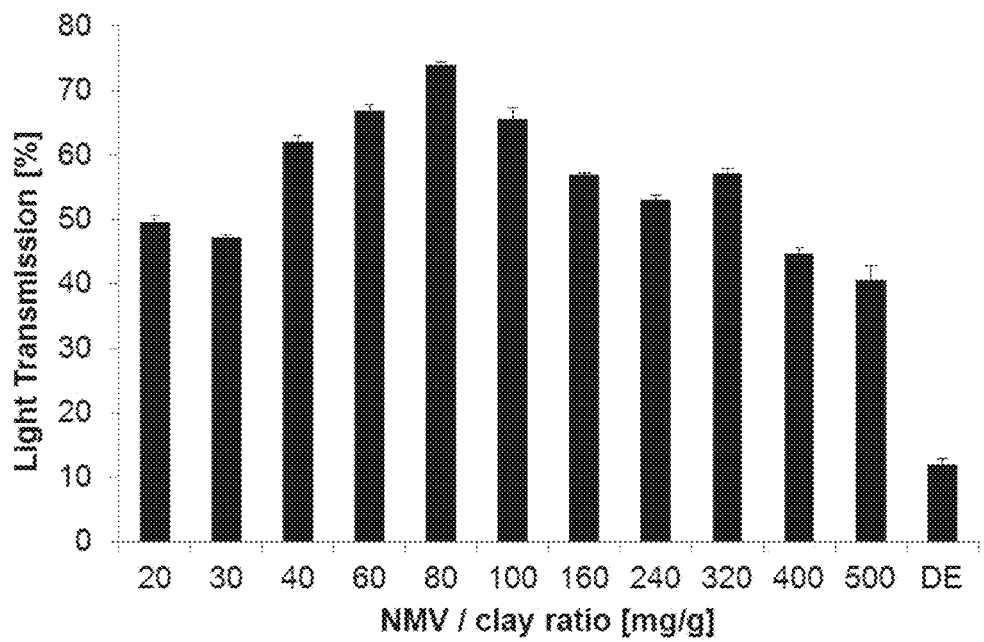

FIG. 18 shows clarification of dairy wastewater as a result of the addition of 5 ml L$^{-1}$ PMVE-S9 nanocomposites with different polymer/clay ratios (Example 14) and measured with a dispersion analyser after 1 minute at 5 g relative acceleration force. DE represents raw effluents.

Figure 19:
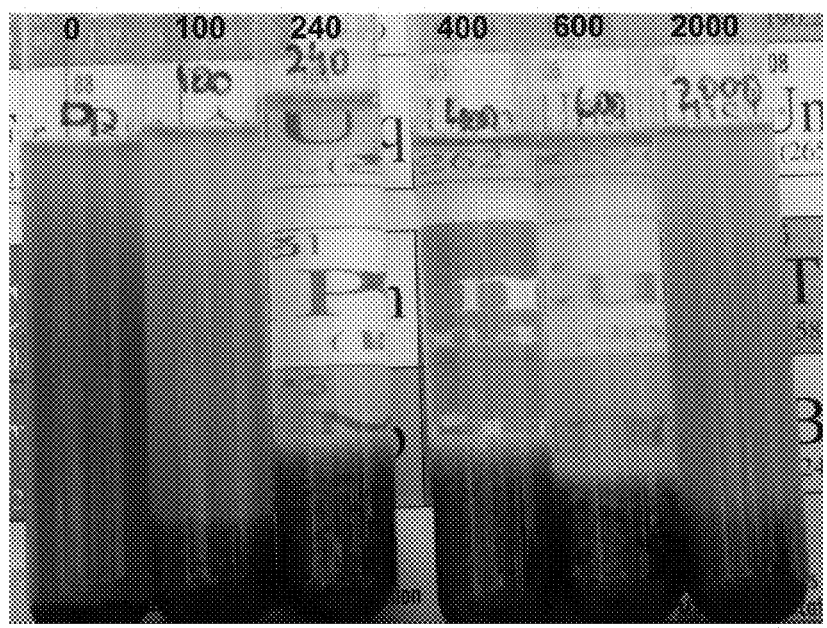

FIG. 19 is a picture of cowshed effluents treated with 2.5 ml L-1 of NC 5% suspension nanocomposites (S9 and PDADMAC) with different polymer clay ratios (in mg/g as indicated in the test tubes), 5 minutes after the coagoflocculant addition and short stirring (Example 14.1).

Figure 20:
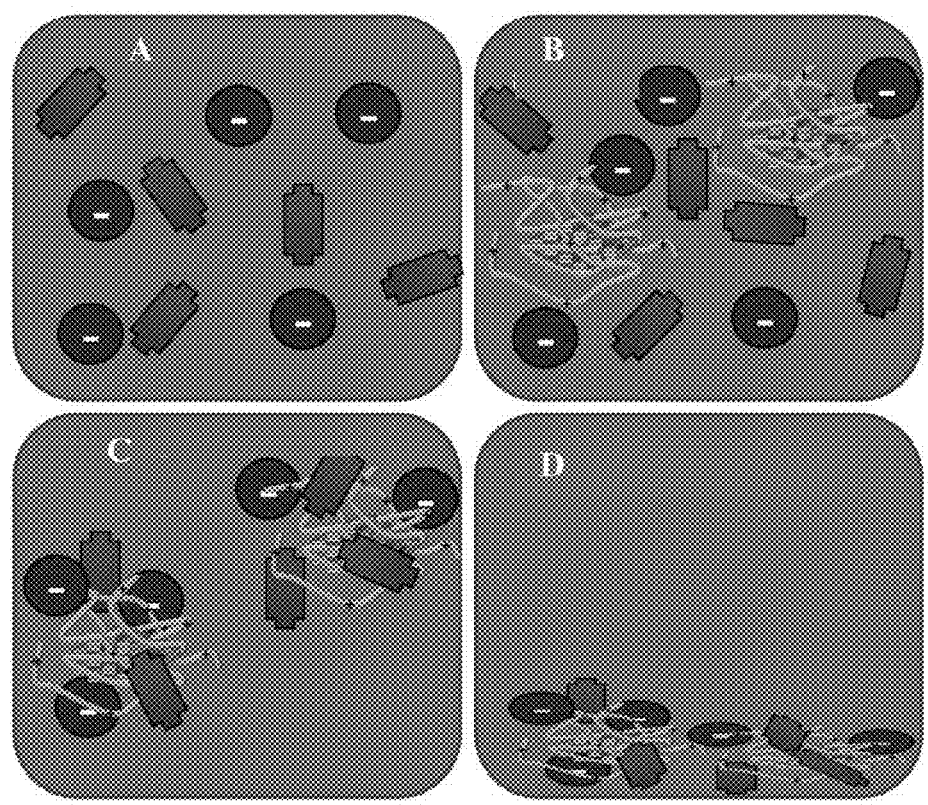

FIG. 20 (panels A-D) is a schematic representation of the coagoflocculation method of the present invention. Panel A is a schematic representation of colloidal effluents. Panel B shows that nanocomposite neutralize the charges of the colloids by binding to them and forming large aggregates with denser nuclei based on clay minerals (panel C), that allows relatively fast sedimentation (panel D).

Figure 21:
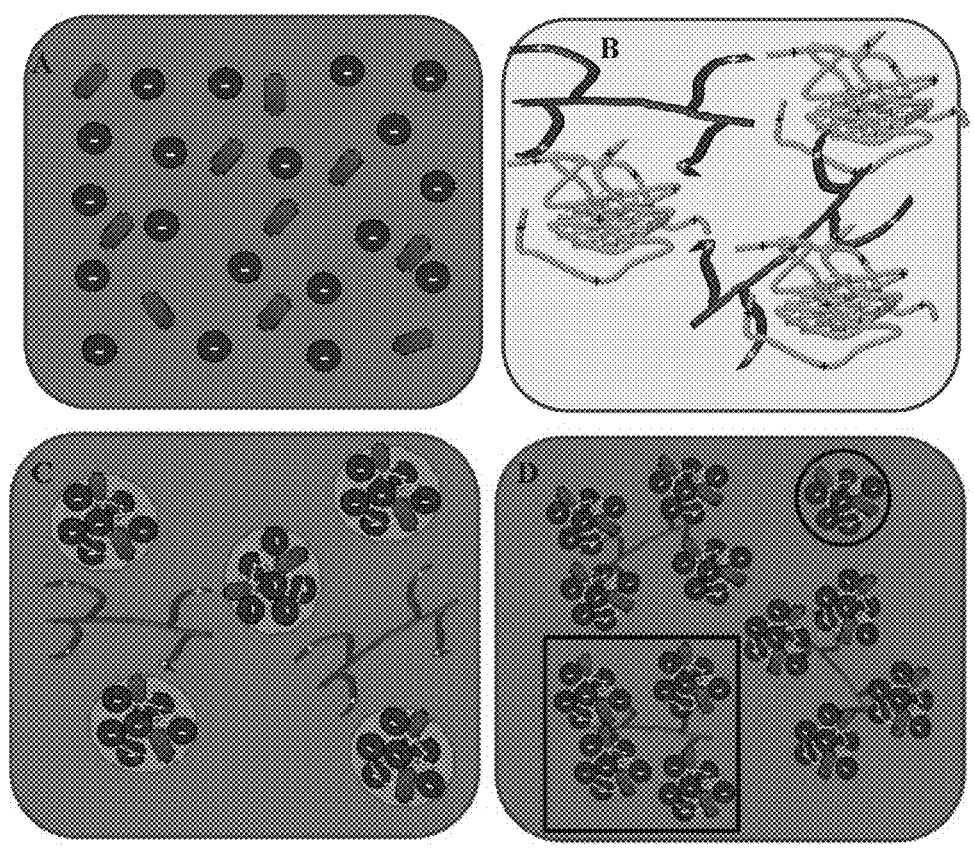

FIG. 21 (panels A-D) is a schematic representation of the coagoflocculation method based on a mixture of a nanocomposite and a bridging polymer. Panel A is a schematic representation of colloidal effluents. Panel B is a schematic representation of an improved coagoflocculant based on a mixture of a nanocomposite and a bridging polymer. Panel C shows slightly negative small flocs formed by the nanocomposites bound to effluent colloids. Panel D shows several small flocs (marked in a circle) bridged by the bridging polymer to large flocs (marked in a rectangle) that can be easily filtered.

Figure 22:
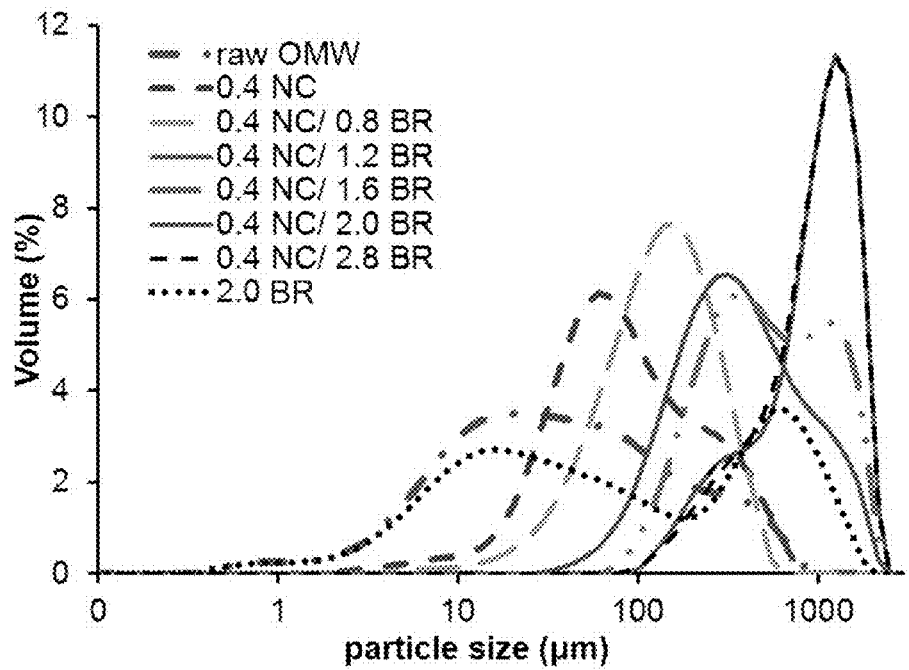

FIG. 22 shows a particle size distribution of raw OMW (red-•), OMW with nanocomposites (NC, purple--), with commercial Zetag® 8848 (BASF®) as a bridging polymer ("BR") (BR, gray--), or a mixture of the nanocomposite and the bridging polymer (NC+BR) (Example 15).

Figure 23:
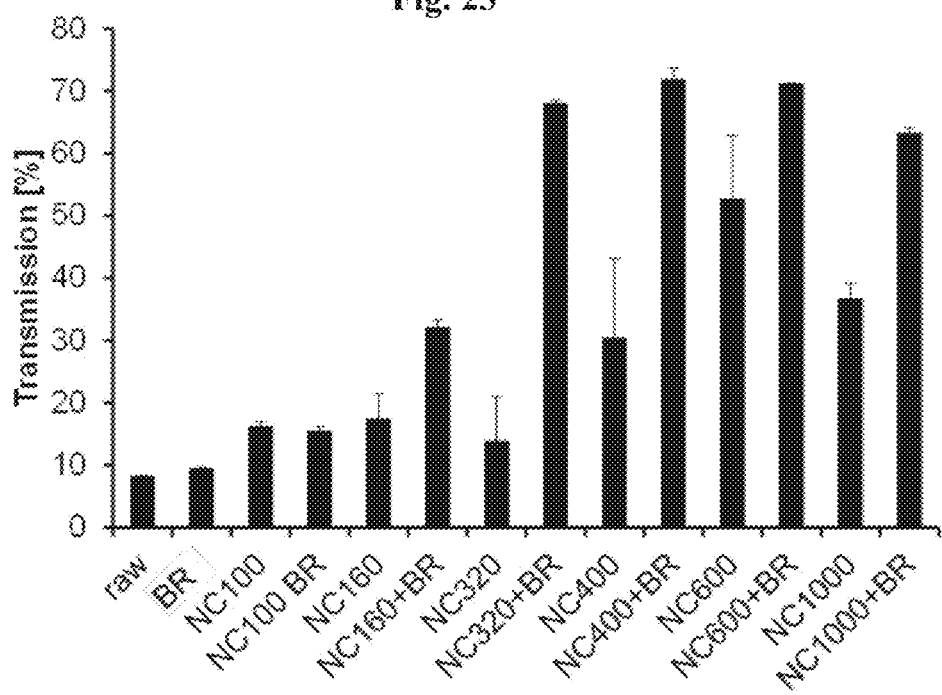

FIG. 23 shows a transmission of OMW treated samples with various NC polymer/clay ratios with ("BR" samples) or without 15 ml L$^{-1}$ of 0.8% BR solution. Results measured 1 min after addition at 5 g RCF (Example 15).

Figure 24:
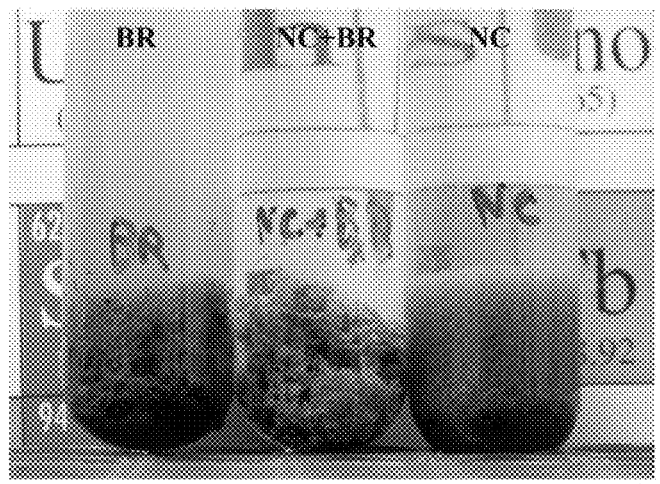

FIG. 24 is a picture of cowshed effluents treated with commercial Zetag® 8848 (BASF®) as a bridging polymer (BR), NC nanocomposite, or with a mixture of both (NC+BR) (Example 15).

Figure 25:
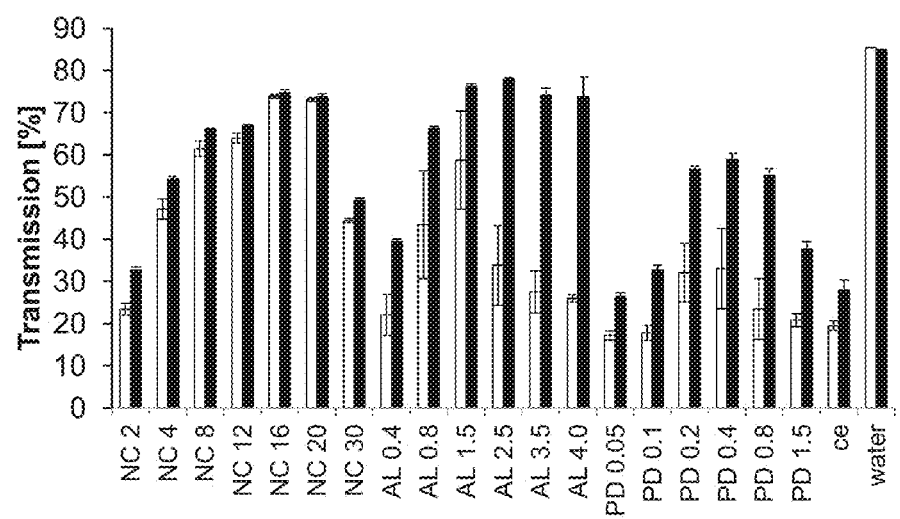

FIG. 25 shows a transmission of cowshed effluents treated with NC16Z nanocomposites (NC), aluminum sulfate (AL) or commercial polyDADMAC (PD). Results measured 1 min after addition at 5 g RCF (Example 16).

Figure 26A:
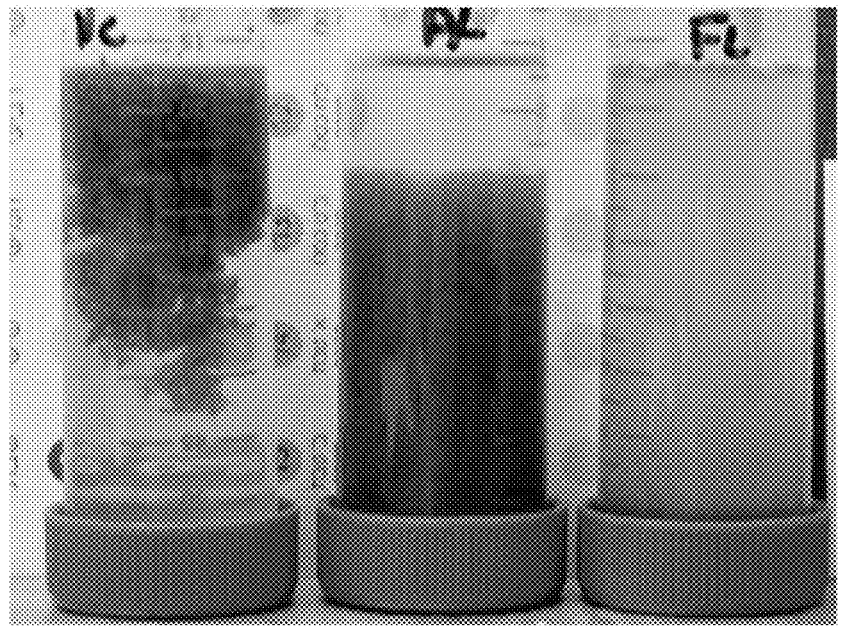
Figure 26B:
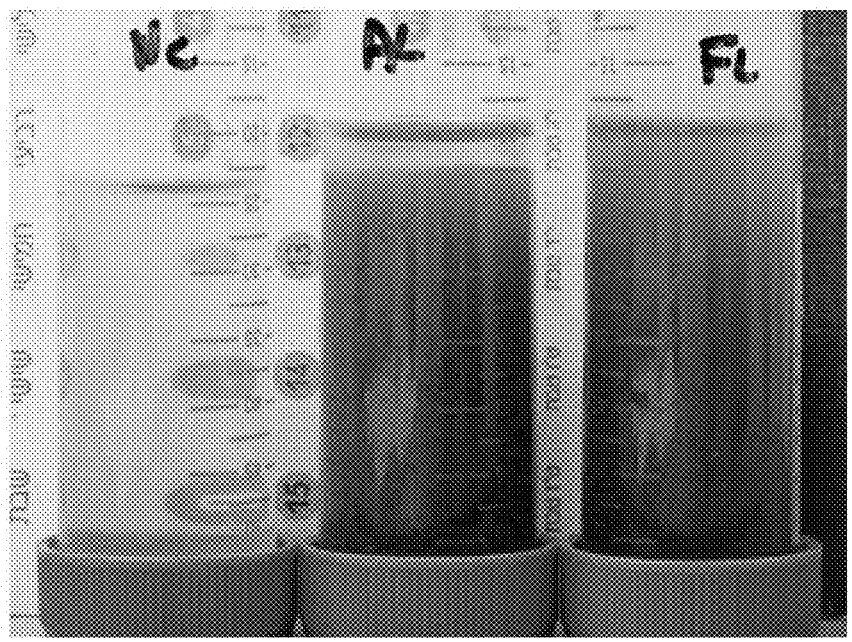

FIGS. 26A-26B shows comparative results for the clarification of cowshed effluents before (26A) and after (26B) filtration through a 212 μm screen (Example 16).

DETAILED DESCRIPTION OF THE INVENTION

The present invention is drawn to the use of nanocomposites comprising anchoring particles and one or more polymers, at least one of the polymers being a polyelectrolyte polymer, for efficient and fast reduction of total suspended solids (TSS) and turbidity in highly loaded organic wastewaters such as olive oil mill, wineries, piggeries, cowsheds, dairy effluents, soy or coffee bean industry, etc, in a single step and in a very short time. The use of such nanocomposites, sometimes referred herein as "coagoflocculants", combines the advantages of a coagulant together with the advantages of a flocculant by neutralizing the charge of the suspended particles while bridging between them and anchoring them to more dense particles such as clay minerals as anchoring particles, thus enhancing their aggregation and separation/precipitation.

The rationale in the use of the nanocomposites is the combination of neutralization of the colloids (coagulation), achieved by the polyelectrolyte polymer's charged sites, and the bridging of the neutralized particles (flocculation), achieved by the fact that the polyelectrolyte polymer chains are connected to denser and larger anchoring particles. According to the invention, suitable nanocomposites based on anchoring particles including, but not limited to, clay minerals, zeolites, diatomaceous earth, and activated carbon, and organic polymers/polyelectrolytes, adapted to the charge of the effluent, yield very efficient pretreatment of wastewater for the reduction of TSS and COD in one single treatment step and in a very short time.

The method of the invention, sometimes referred herein as coagflocculation process, is also suitable for treatment of recreational water with high organic load or large amounts of algae and such pretreatment of recreational water is encompassed within the scope of the present invention.

In previous studies, we shoved that organoclays presented an effective "double mode mechanism" adsorption of phenolic compounds such as picric acid, with very high affinity at low concentrations, and partition effect at larger amounts (Gonen and Rytwo, 2006). We then showed adsorption of phenolic compounds (trinitrophenol and trichlorophenol) by nanocomposites similar to those described herein (Ganigar et al., 2010), with very fast sorption kinetics similar to values showed previously for organoclays, and two-three orders of magnitude faster than for activated carbon (Rytwo and Gonen, 2006).

However, removal of phenolic compounds is only a by-side additional beneficial effect. The main purpose of the coagoflocculants used in the present invention is to achieve substantial, i.e., two orders of magnitude, reductions in TSS and turbidity, in very short time (minutes to tens of minutes) in a single step. Specific adaptation of the nanocomposites is needed for use with specific effluents, but the choice of the suitable nanocomposite might easily be made by calibration-preliminary experiments using suitable instruments as presented below in the examples, or similar calibration experiments can be performed using conventional "jar test" procedures (von Homeyer et al., 1999).

Organoclays (not nanocomposites, namely, the organic molecule is not polymeric) have been disclosed by the inventor as efficient for pretreatment of organic effluents in a two-step process (Rytwo et al., 2011). The nanocomposites disclosed herein allow obtaining similar results in just one step, whereas conventional techniques as the use of aluminum sulfate ("alum") or polymers alone yields similar results but only after considerably longer periods of time.

The present invention thus relates to a method for pretreatment of wastewater or recreational water with high organic load or large amounts of algae for reduction of total suspended solids (TSS), chemical oxygen demand (COD) and turbidity, wherein the method comprises the treatment in one single step of said wastewater or recreational water with a nanocomposite consisting of an anchoring particle and one or more polymers, at least one of said polymers being a polyelectrolyte polymer, whereby neutralization of charged colloidal particles suspended in the wastewater or recreational water occurs while bridging between them and anchoring them to the anchoring particles, thus enhancing their aggregation and precipitation and achieving a substantial reduction of TSS and turbidity in a very short time.

In certain embodiments, the nanocomposite consists of an anchoring particle and one, two or three polymers, one of which is a polyelectrolyte polymer.

The stability of a dispersion is related to the size of the particles, their density and their charge. Since in most organic effluents, such as olive oil mill, wineries, piggeries, cowsheds, slaughterhouses, fruit and vegetable processing industry, or soy or coffee bean industry, and the recreational water is a coastal beach or a lake, river or pond, the colloidal particles usually have a negative charge, the polymer should have positive charges to neutralize the negative charge of the colloids/colloidal particles. In addition, the polyelectrolyte polymer should preferably have medium to long chains with the charges dispersed along/throughout such as to allow the bridging of the neutralized colloidal particles between them while anchoring to the anchoring particles. The polyelectrolyte polymer should also be relatively soluble in water to allow its efficient distribution in the effluents.

Thus, according to certain embodiments the polyelectrolyte polymer is a water-soluble polycationic polymer, with medium to long chain (500-5000 monomers) and charges dispersed along/throughout the polymer.

According to certain embodiments, the polycationic polymer is selected from: (i) linear water-soluble polymer selected from poly(diallyl dimethylammonium) chloride (herein poly-DADMAC or PDADMAC) and cationic polyacrylamide; (ii) a polyquaternium selected from quaternized hydroxyethylcellulose ethoxylate and poly [(2-ethyldimethylammonioethyl methacrylate ethyl sulfate)-co-(1-vinylpyrrolidone)]; (iii) cationic biopolymers selected from cationic guar gum and chitosan; and (iv) polymers with aromatic rings such as poly-4-vinylpyridine-co-styrene and other styrene-containing polymers. In preferred embodiments, the polymer is poly-DADMAC or chitosan.

In certain embodiments, the one or more polymers is a non-ionic polymer. Examples of non-ionic polymers for use according to the present invention include, but are not limited to, polyethylene glycol, cellulose ether, polyvinyl alcohol, polyvinylpyrrolidone, and copolymers containing aromatic units as styrene, for example, styrene-acrylic acid copolymers.

For efficient coagofloculation the anchoring particles should have the following properties:
(i) a size/diameter of less than 0.5 micron at least in one dimension, resulting in a large specific area;
(ii) the ability to adsorb polyelectrolytes in strong interactions; and
(iii) the bulk density of the particles should be larger than the density of the effluents.

According to certain embodiments the anchoring particles are clay minerals (aluminium or magnesium phyllosilicates). The clay minerals can be acicular (needle-like) clay minerals such as sepiolite and palygorskite, or clay smectites such as bentonite, montmorillonite, hectorite, laponite and saponite. In certain particular embodiments, the clay mineral is sepiolite or bentonite. According to other embodiments the anchoring particles are non-clay minerals such as zeolites, diatomaceous earth or powdered activated carbon.

The schematic structure of a single block and connected blocks of sepiolite are shown in FIGS. 1A and 1B, respectively. All corners are connected to adjacent blocks, but in outer blocks some of the corners form neutral sites (5) accessible to organic non-charged molecules. In addition to that, some isomorphic substitutions in the lattice of the mineral form negatively charged adsorption sites (4). These characteristics of sepiolite make it a powerful sorbent.

Poly-DADMAC is a homopolymer of the formula I (below) used in of effluent treatment, water purification, and paper industry.

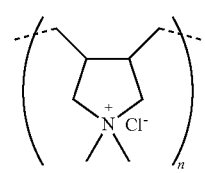

I

The coagofloculation method/process of the present invention is summarized in general in FIG. 20. Panels A-D in FIG. 20 show a schematic representation of the coagofloculation process. Panel A is a schematic representation of colloidal effluents. The nanocomposites as shown in panel B neutralize the charges of the colloids by binding to them and forming large aggregates with denser nuclei based on clay minerals (panel C), that allow relatively fast sedimentation or separation (panel D).

In certain embodiments, the nanocomposite for use in the method of the invention is comprised of a clay mineral and a polycationic polymer. In certain embodiments, the clay mineral is sepiolite or bentonite and the polycationic polymer is poly-DADMAC or chitosan. Examples of such nanocomposites include poly-DADMAC-sepiolite, poly-DADMAC-bentonite and chitosan-sepiolite.

In certain embodiments, the polyelectrolyte is a polyanionic polymer. As shown in Example 14, herein after, the charge of three dairy wastewater samples was positively charged, thus the polyelectrolyte polymer should have negative charges to neutralize the positive charge of the colloidal particles. The polyanionic polymer should have medium to long chains with charges dispersed along/throughout to allow the bridging effect. The polyanionic polymer should also be relatively soluble in water to allow its efficient distribution in the effluents.

Thus, according to certain embodiments the polyelectrolyte polymer is a water-soluble polyanionic polymer, with medium to long chain (500-5000 monomers) and charges dispersed along/throughout the polymer. Examples of polyanionic polymers for use in pretreatment of positively charged effluents such as dairy effluents include, but are not limited to, poly(methyl vinyl ether-alt-maleic anhydride) (PMVE) copolymer of the formula II (CAS 9011-16-9), poly(acrylamide-co-acrylic acid) (PAM) copolymer of the formula III (CAS 62649-23-4), polysulfonates, and natural anionic polymers such as carrageenans.

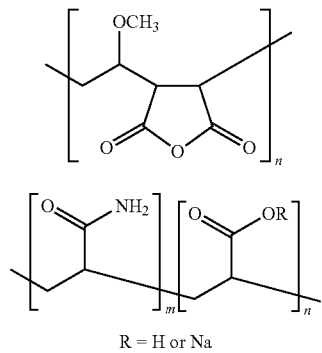

In certain embodiments, the nanocomposite for use in the method of the invention is comprised of a clay mineral and a polyanionic polymer. In certain embodiments, clay mineral is sepiolite and the polyanionic polymer is PMVE or PAM. Examples of such nanocomposites include PAM-sepiolite and PMVE-sepiolite.

The quantitative ratio between the polymer and the clay is very important. In certain embodiments, the quantitative ratio between poly-DADMAC and sepiolite in the poly-DADMAC-sepiolite nanocomposite is within the ranges 3 to 3000 mg/g, 30 to 2400 mg/g, 80 to 1800 mg/g, or 500 to 1000 mg/g. In other certain embodiments, the quantitative ratio between poly-DADMAC and bentonite in the poly-DADMAC-bentonite nanocomposite is within the ranges 3 to 500 mg/g, 30 to 490 mg/g, or 130 to 165 mg/g. In yet other certain embodiments the quantitative ratio between chitosan and sepiolite in the chitosan-sepiolite nanocomposite is within the ranges 3 to 1200 mg/g, 120 to 1000 mg/g, or 500 to 800 mg/g.

In certain embodiments, the quantitative ratio between PMVE copolymer and sepiolite in the PMVE-sepiolite nanocomposite is within the ranges 20 to 500 mg/g, 40 to 320 mg/g, or 60 to 100 mg/g. In other certain embodiments, the quantitative ratio between PAM copolymer and sepiolite in the PAM-sepiolite nanocomposite is within ranges 20 to 500 mg/g, 100 to 400 mg/g, or 200 to 300 mg/g.

According to certain embodiments the quantitative ratio between the polyelectrolyte polymer and the anchoring particles is adapted to the type of the industrial organic effluent or recreational water to be treated. For example, if the wastewater is from wineries, the nanocomposite poly-DADMAC-sepiolite should preferably be used at the ratio of 60-100 mg polymer/g of clay. If the wastewater is from olive oil mills, the nanocomposite poly-DADMAC-sepiolite should be used at the ratio of 1800-2400 mg polymer/g of clay. If the wastewater is from cowshed effluents, the nanocomposite poly-DADMAC-sepiolite should be used at the ratio of 150-240 mg polymer/g of clay. If the wastewater is from dairy effluents, the nanocomposite PMVE-sepiolite should be used at the ratio of 60-90 mg polymer/g of clay.

Thus, the present invention facilitates the design of various nanocomposites which are tailored to efficiently adsorb specific pollutants/colloids, characteristically found in different types of industrial organic effluents or of recreational water. By controlling the charge of the nanocomposites (dependent on the type of polymer, the type of anchoring particle, and the quantitative ratio between them) it is possible to optimize the pretreatment of various organic effluents or of recreational water.

In accordance with the present invention a direct evaluation of the efficient type and dose of coagulants/flocculants in general, and nanocomposites in particular can be made based on particle charge detector (PCD) measurements of the effluents and the neutralizing material, as shown in Example 13, hereinafter.

The invention further relates to the possibility of further use of the nanocomposite after the first use for additional coagoflocculation of the effluent. This can be made by boosting the used nanocomposite with a small dose of fresh nanocomposite, for example, 10 to 25% of the original amount of the nanocomposite.

In order to allow fast filtration, the present invention provides an improvement that increases the size of the flocs yielding even faster sedimentation on one hand, and easy filtration on the other hand. This improvement is based on a mixture of a nanocomposite and a bridging slightly charged polymer. This bridging polymer should be based on large branches with relatively separated charges. FIG. 21 is a schematic representation of such combined approach.

Thus, in certain embodiments, the method of the present invention is carried out with a mixture of a nanocomposite with a bridging polymer having the same charge of the nanocomposite. The bridging polymer is a branched polymer with long and slightly charged branches. Examples of bridging polymers for use herein include, but are not limited to acrylamide/dimethylaminoethylacrylate methyl chloride copolymers (AM-co-DMAEA) or similar polymers such as commercial Zetag® 8848FS (BASF®) or CT640® (SNF®).

In certain embodiments, the method of the present invention is carried out with a mixture of a nanocomposite consisting of a clay mineral such as sepiolite, and a polycationic polymer such as PDADMAC, and a bridging polymer such as AM-co-DMAEA copolymers or similar polymers, preferably Zetag® 8848FS.

It should be understood that a mixture of the nanocomposites and a bridging polymer increases also the velocity of the process, as shown in Example 15, herein after. FIG. 23 demonstrates the efficiency of the different 5% nanocomposite suspensions added at 5 ml $L^{-1}$ OMW, with or without a dose of 15 ml $L^{-1}$ of 0.8% a.i. BR bridging polymer solution, 1 minute after addition of the coagoflocculant at a relative acceleration force of 5 g. It can be seen that BR alone did not clarify the OMW, but when added with NC yielded improved and very fast clarification. It should be emphasized that after 10 min the samples reached the same transmission with or without addition of BR. Thus, the main influence of the BR in addition to enlarging the flocs, is in speeding the process.

The invention will now be illustrated by the following non-limiting Examples.

EXAMPLES

Materials.

Olive mill wastewater was kindly supplied by in Kamonin Olive Mill (Lower Galilee, Israel). Winery effluents were obtained from Gall Mountain Winery (Yiron, Upper Galilee, Israel). Sepiolite S9 (<200 mesh) was provided by Tolsa S. A. (Madrid, Spain), with 99% pure mineral content, and poly(diallyldimethylammonium) chloride (poly-DADMAC; medium and high molecular weight 200,000 to 350,000 and 400,000 to 500,000, respectively, was purchased from Sigma-Aldrich (Israel). Chitosan (medium molecular weight, 75-85% deacetylated) was purchased from Sigma-Aldrich (Israel). Bentonite (Food Grade Volclay® KWK, fine granular sodium bentonite with an average particle size between 20 and 70 mesh) was purchased from American Colloid Company (Arlington Heights, US). All materials were used without further treatment or purification.

Example 1

General Method for Preparation of the Nanocomposites

Nanocomposites were prepared at loads ranging between 3 and 2400 mg polymer/g clay at 100 g clay per kg (10%) suspension for NC, 3 and 1200 trig polymer/g clay at 50 g clay per kg (5%) suspension for NH, and 3 and 500 mg polymer/g clay at 20 g clay per kg (2%) suspension for NV. Clay and polymer concentrations were chosen to obtain a sufficiently fluid suspension, allowing accurate and efficient application.

Example 2

Preparation of Nanocomposites Comprising Sepiolite S9 and Poly-DADMAC, Herein Identified as NC Nanocomposites were prepared from sepiolite and poly-DADMAC at loads ranging between 3 and 2400 mg polymer/g clay. Concentrated batches containing 100 g clay/kg (10%) suspension were prepared. To produce the nanocomposites, a solution containing the requested amount of polymer was prepared according to the desired amount of polymer per g of clay. As an example, the procedure for the preparation of a 10% stock suspension of 50 g nanocomposite with 100 mg poly-DADMAC/g sepiolite S9 was as follows. The concentrated polymer (poly-DADMAC, usually 40% w/w) was dissolved in a suitable amount of warm water to obtain a final volume of 500 ml, containing 5 g of the polymer. The solution was placed in a sonication bath to obtain a homogeneous solution. Upon complete dissolution, the polymer solution was poured into a container with 50 g of sepiolite and agitated vigorously for 2 hours. Preparation was complete when clay aggregates were no longer observed, and the viscosity of the suspension was relatively low. Increased viscosity indicates that the polymer is not well dissolved or that the process is not yet complete, since a 10% suspension of most clay minerals in water (without polymer) yields a paste that cannot be efficiently used.

Example 3

Preparation of Nanocomposites Comprising Sepiolite S9 and Chitosan, Herein Identified as NH Nanocomposites NH nanocomposites were prepared as described in Example 1, but at loads ranging between 3 and 1200 mg polymer/g clay at 50 g clay/kg (5%) suspension for NH.

Example 4

Preparation of Nanocomposites Comprising Volclay Sodium Bentonite and Poly-DADMAC, Herein Identified as NV Nanocomposites NV-nanocomposites were prepared as described in Example I, but at loads ranging between 3 and 500 mg polymer/g clay at 20 g clay/kg (2%) suspension for NV.

Example 5

Analytical Measurements—Electrokinetic Charge Measurements

Electrokinetic charge of the nanocomposite suspensions and the effluents before and after treatment were measured by means of a particle charge detector (TYHtek PCD 03) with an automatic titration unit (Mütek titrator T2) using charge-compensating polyelectrolytes as described by Rytwo et al. (2011). Electrokinetic effects occur whenever there is a distortion of counter ions due to movements of charged particles relative to the surrounding solution, and they are widely used to characterize the charge distribution around colloidal particles in an aqueous solution. Results were normalized to $\mu mol_c/g$ (micromoles of charges per gram) of nanocomposite or to $mmol_c/L$ of effluent, accordingly. All experiments were performed in triplicate.

FIG. 3 presents the charges (mmol/Kg clay) of the nanocomposite suspensions with an amount of polymer ranging from 0-800 mg/g of clay. For the NC and NH nanocomposite samples, the charge of suspensions with higher polymer/clay ratios presented a linear function of the amount of polymer in the composite, with a slope of 5.3 $mmol_c/g$ polymer for NC (NC=5.29x-35.8; $R^2$=0.999), and 4.8 $mmol_c/g$ for NH (NH=4.78x-227; $R^2$=0.996). Slope for NV (NV=5.37x-272; $R^2$=0.9777) was almost identical to NC values. Such results should be expected, since the same polymer poly-DADMAC, was used for both nanocomposites.

Theoretical slopes for poly-DADMAC and chitosan according to the molecular weight of the charged monomers should yield 6.2 and 5.6 $mmol_c/g$ polymer, respectively. Thus it appears that the efficient charges are about 85%-90% of the monomers. Such evaluation fits the manufacturers data for chitosan.

Example 6

Analytical Measurements—Harmonic Mean Sedimentation Velocity

The poly-DADMAC-sepiolite nanocomposites were tested for their influence on the sedimentation rate of olive oil mill and winery wastewaters (OMW and WW, respectively). Sedimentation velocities were measured by means of a LUMiSizer instrument. The instrument records the NIR (near infrared) light transmission during centrifugation over the total length of a cell containing the suspension. It automatically determines the time dependence position of the interface panicle-free fluid/suspension or sediment by a special algorithm. The transmission profile enables characterizing the smallest deviations in size of dispersed particles and quantifying the degree of polydispersity at high-volume concentrations. Stability prediction at an accelerated rate for different dispersions at their original concentrations has been proven in previous studies (Lerche, 2002). The harmonic mean sedimentation velocity in the first 60 seconds of the process was chosen as a useful parameter to compare between treatments. High sedimentation velocities were measured when fast precipitation was observed. The reason to focus on the first 60 s is because in the efficient treatments, complete clarification was observed after that period of time. Such experiments allow evaluating the efficiency of the wastewater treatment by a very fast and accurate procedure as compared with the conventional "jar test" (Homeyer et al, 1999). Experiments were performed three times.

FIGS. 4 and 5 present such sedimentation rates for winery wastewater (WW) and olive oil mill wastewater (OMW), respectively, as a function of the polymer/clay ratio. It can be seen that winery wastewater sedimentation rate was increased almost 10 folds by adding poly-DADMAC-sepiolite nanocomposites with approximately 70 mg polymer per g clay. Olive oil mill wastewater is considerably more charged (see Table 1) and nanocomposites that increase sedimentation rates in winery wastewater did not enhance sedimentation in olive oil mill wastewater. However, highly charged poly-DADMAC-sepiolite nanocomposites (1800 mg polymer/g clay) sped up sedimentation more than 10 folds the sedimentation rate of raw effluents.

Table 1 shows changes in physicochemical parameters in batch experiments, before and 30 minutes after addition of the suitable nanocomposites to each effluent. Whereas the pH remained unchanged and the electric conductivity was reduced by 5-20%, complete neutralization and even charge reversal of both effluents (up to values of about 5% of the absolute initial charge) were observed. The more important feature of the nanocomposites was a 97% reduction in TSS and turbidity in 30 m. It should be mentioned that a 90% reduction in total Kjeldahl N and a 40% reduction in chemical oxygen demand (COD) was also measured (not shown).

TABLE 1

Physicochemical parameters of effluents upon addition of 0.1% of a suitable coago-flocculant

| Effluent | | pH | electrokinetic charge $\mu mol_c\, l^{-1}$ | electrical conductivity $\mu Si\, cm^{-1}$ | turbidity NTU | TSS mg $l^{-1}$ |
|---|---|---|---|---|---|---|
| Winery | untreated | 4.66 | −174 | 2460 | 764 | 1610 |
| | treated after 30 minutes | 4.69 | +10.1 | 2040 | 19.6 | 76 |
| Olive oil mill | untreated | 4.40 | −48400 | 8160 | >4000 | 1880 |
| | treated after 30 minutes | 4.38 | +920 | 7680 | 91 | 94 |

Example 7

Analytical Measurements—Flocculation Kinetics in Winery Effluents Treated with Nanocomposites, its Components Separately, or Alum To compare the efficiency of flocculation of nanocomposites with other widely used treatments, 0.1% nanocomposites with 60 mg poly-DADMAC/g sepiolite was added to winery effluents, and the relative absorbance of the effluent (the ratio of the optical density at a given time related to the optical density before the addition of coagulant/flocculant) was compared to that of the nanocomposite components (sepiolite and poly-DADMAC) separately at the same added amounts of active compound. The efficiency of flocculation by 0.1% aluminum sulfate (alum) was also determined for comparison, since it is a widely used flocculant. Measurements were performed at three wavelengths (420, 450, and 480 nm), and the average relative absorbance values were evaluated.

FIG. 6 is a graph showing flocculation kinetics (relative light attenuation) as a function of time in winery effluents, upon addition of 0.1% nanocomposite with 60 mg poly-DADMAC-sepiolite composite (♦), 0.1% alum (■), and the equivalent amounts of sepiolite (▲) or poly-DADMAC (●) separately.

Strong temporal fluctuations were due to large flocs, which could be clearly seen with the naked eye, that initially floated up in the tube and eventually sank to the bottom. The nanocomposites achieved almost complete clarification in a range of minutes. It should be emphasized that at long equilibration times (24 h), clay and alum treatments produced more or less the same results, whereas the polymer alone at that added rate did not enhance clarification. However, the observed rapid (on the order of minutes) flocculation is the main feature of the nanocomposites of the present invention: this might enable continuous flow in treatment plants, thereby eliminating the large sedimentation tanks necessitated by the long periods required for sedimentation to occur. Thus, the results presented here indicate that the nanocomposites of the invention might speed up precipitation process. By reducing clarification time from several hours to minutes, the need of large precipitation tanks required for slow treatments might be avoided, making the wastewater treatment an almost continuous process.

Example 8

Physical Characterization of the Nanocomposites

In order to further investigate the structure of the nanocomposites, X-ray diffraction (XRD) and electron microscopy measurements were performed (we thank Dr. Stefan Dultz, Hannover University, Germany for his assistance).

8.1 XRD Measurements

For the XRD measurements a Siemens-diffractometer (D 500) with Bragg-Brentano geometry 143 and Co Kα-radiation was used. Samples were dispersed in deionized water, sedimented on 144 glass slides and air-dried.

X-ray diffraction was measured in samples of poly-DADMAC-sepiolite S9 nannocomposites comprising the following ratios of polymer/clay: raw sepiolite S9, 32 mg/g, 97 mg/g 194 mg/g and 1620 mg/g, and its influence on the c-spacing of the composite structure.

FIG. 7A shows the influence of the amount of added poly-DADMAC in mg polymer/g clay on the c-spacing of the structure. It can be observed that even very large amounts of poly-DADMAC incorporated in sepiolite S9 did not change the distance between the needles of the mineral, and the general structure remained unchanged. Schematic diagrams of raw sepiolite (the first curve from the bottom), sepiolite with low amount of polymer (32, 97, or 194 mg polymer/g clay), and sepiolite with high amount of polymer (1620 mg/g, the first curve from the top) are presented in the figure.

In another experiment, the samples consisted of poly-DADMAC-Volclay smectitic bentonite (NV samples) comprising the following ratios of polymer/clay: raw bentonite, 16 mg/g, 32 mg/g, 97 mg/g, 130 mg/g, 162 mg/g, 245 mg/g and 490 mg/g. The results are depicted in FIG. 7B. Schematic diagrams of raw bentonite (first curve from the bottom), bentonite with low amount of polymer, and bentonite with high amount of polymer are presented in the figure. A clear increase in the basal spacing was observed from raw bentonite (c-spacing of ~1.3 nm, first curve from the bottom) to bentonite with 490 mg polymer per g clay (first curve from the top), where c-spacing increased to more than 2.7 nm. In samples prepared with high molecular weight poly-DADMAC c-spacing at large loads increases even further (3.2 nm at 490 mg polymer per g clay) (results not shown).

8.2 Electron Microscopy Measurements

For determination of the poly-DADMAC-sepiolite nanocomposite microstructure an environmental scanning electron microscope (Fei, Quanta 200) was used. Back scattered electron images of the samples were taken at room temperature and at high vacuum. FIG. 8, panels A-I, shows the influence of incorporated amounts of poly-DADMAC on the general microstructure of the sepiolite fibers. It can be seen that at low amounts of poly-DADMAC (32 mg/g: panels B, E and H, nanocomposites suitable for the treatment of winery effluents), "flakes" of sepiolite fibers glued by the polymer can be observed. At high polymer amounts (1620 mg/g: panels C, F and I, nanocomposites suitable for the treatment of olive oil mill effluents), instead of flakes, a "ropes"-like structure is formed, and a complex network of such ropes can be clearly observed at the ×1000 magnification (panel C).

Example 9

Sequential Additions of Nanocomposites to Effluents

After sedimentation of the organic solids upon treatment of effluents with the nanocomposites of the invention, the same nanocomposites can be used in further pretreatment cycles of the effluents after addition of a boost of the same nanocomposite, in this way, several cycles of effluents can be applied to the same flocculants dose, and efficient turbidity reduction can be obtained for several cycles.

The following procedure was used: to the first cycle of effluent a dose of 20 mL/L of a 5% suspension of the suitable nanocomposites (as determined and described in Example 6, herein above, and Examples 10-11, herein after) was added. The effluent was stirred for 30 s and then centrifuged at 50 g for 10 minutes. The supernatant was removed and its turbidity was measured and evaluated as "relative turbidity" by comparing it to the turbidity of the raw effluents after 10 minute centrifugation at 50 g. To the sediment a new cycle of effluents was added. A "boosting" dose of 5 mL/L 5% nanocomposites suspension was added to the effluents. The process was repeated and several cycles were performed until relative turbidity was higher than 10%, thus the turbidity-removal as compared with the raw centrifuged effluents decreased from 90%.

FIG. 9 shows relative turbidity removal for OMW (white bars; collected from Kadoori Olive Mill, in December 2011) and winery effluent (WE) (black bars: collected from Galil Mountains Winery, April 2012). Initial turbidity of centrifuged untreated OMW was 1570±99 nephelometric turbidity units (NTU), using poly-DADMAC-sepiolite S9 nanocomposites with 970 mg polymer/g clay, Initial turbidity of centrifuged untreated WE was 754±37 NTU, using the poly-DAM/AC-sepiolite S9 nanocomposites with 50 mg polymer/g clay.

It can be seen that if efficient turbidity removal is defined as higher than 90%, then 6 and 7 cycles can be performed for WE and OMW, respectively. Total doses added were 40 and 44 mL/L of a 5% nanocomposite suspension, equivalent to a total of 2 and 2.2 g clay, respectively. Thus, less than 0.35 kg of clay as nanocomposite would yield efficient turbidity reduction from 1 $m^3$ of effluents.

In the case of winery effluent, the coagoflocculation process presented herein was performed in a field experiment combining coagoflocculation and constructed wetlands (not shown). The process used nanocomposites based of PDADMAC and sepiolite at ratios of 35 to 70 mg polymer/g clay, over more than 40 $m^3$, with >90% reduction in turbidity and TSS. Several cycles were applied with an initial dose equivalent to 1 kg clay/$m^3$, followed by boosting doses of 0.25 kg clay/$m^3$ in up to 10 consecutive cycles. The average dose was approximately 0.32 kg clay/$m^3$.

Example 10

Evaluation of Different Nanocomposites on Olive Oil Mill Effluents (OMW)

As shown in Example 6, poly-DADMAC-sepiolite nanocomposites (NC) have been proven efficient in fast coagoflocculation of OMW. A dispersion analyser instrument was used to determine sedimentation rates by recording NIR (near infrared) light transmission during centrifugation over the total length of a cell containing the suspension.

The same procedure above was used to test additional nanocomposites. Effluents from Kadoori olive oil mill collected during December 2011 were tested for clarification, using PDADMAC-sepiolite (NC) or chitosan-sepiolite (NH) nanocomposites. FIGS. 10A-10B show relative light intensity through the upper part of a test tube, as a function of time, for OMW treated with NC nanocomposites (FIG. 10A) or with NH nanocomposites (FIG. 10B) added at a 1 g/L clay dose. Centrifugation was performed at a centrifugal force equivalent to 32.8 g.

It can be seen that intensity of light through raw OMW samples was approximately 10% (dashed black line). NC nanocomposites with 100 tug polymer/g clay ratio (dotted black line) did not improve much, and light intensity after 5 minutes of centrifugation was increased to about 30%. Increasing polymer/clay ratios improved efficiency of clarification, and at ratios of 800 (solid green line) and 970 (dashed sky blue line) mg polymer/g clay, light intensity of about 60% was measured after 5 minutes of centrifugation.

Chitosan-sepiolite nanocomposites (FIG. 10B) showed an even more impressive performance. More specifically, at low polymer/clay ratios, e.g. 100 (dotted black line) or 200 ("•••-••-"purple line) mg polymer/g clay, light intensity of 30-40% was measured, at 490 (dashed red line) and 650 (solid green line) mg polymer/g clay a light intensity of more than 60% was measured after only 2 minutes of centrifugation. It should be emphasized that very high polymer/clay ratios in NH sample reduce performance. For example, in samples with 970 (dashed sky-blue line) mg polymer/g clay light intensity went down to 55% and 28%, respectively, after 2 min of centrifugation.

FIGS. 11A-11F show recorded evolution (from left to right) of time dependent transmission profiles of several samples from those described in FIGS. 10A-10B. Profiles were taken every 10 s at a relative centrifuge force (RCF) of 32.8 g (500 rpm), for 30 minutes. Particle migration due to centrifugal force results in a variation of the local particle concentration and correspondingly local and temporal variations of light intensity through the sample occur. Each 10 s a light intensity profile of each individual sample was recorded by a sensor. Sensor resolution allowed detecting small changes of the position of an interface between two phases. The first profile (FIG. 11A) depicts the position of the interface immediately after the start of the centrifuge (10 s). The overlay of profiles at the right side (thickening of the line) documents that the sedimentation process came to its end and marks the position of the sediment (Lerche, 2002). The fluctuation in position of approximately 108 mm indicates the meniscus between the suspension and the air above, whereas decreased light intensity in positions>125 mm indicates the sedimented particles. Sediment thickness can be evaluated according to the light intensity values at the bottom of the tubes.

It can be seen that intensity through the raw OMW sample (FIG. 11A) almost does not change due to centrifugation. Addition of any type of nanocomposites changes the behavior, NC with 100 mg polymer/g clay (FIG. 11B) yielded even after a long time a light intensity of about 40%. NH with 120 mg polymer/g, clay (FIG. 11D) depicted a similar behavior. NH with high polymer/clay ratio (1000 mg/g, FIG. 11F) showed very fast sedimentation, but light intensity remains low (about 30%). NC with 800 (FIG. 11C) yielded light intensity of about 60%, whereas NH with 600 rug polymer/g clay (FIG. 11E) yielded more or less the same final results, but sedimentation was faster than for NC. Thus, nanocomposites based on chitosan and sepiolite appear to be effective at least as those based on PDADMAC-sepiolite.

Example 11

Evaluation of Different Nanocomposites on Winery Effluents (WE)

As shown in Example 6, poly-DADMAC-sepiolite nanocomposites have been proven efficient also in WE. This present example shows results measured by a dispersion analyzer on WE treated with three different types of nanocomposites, Effluents from Galil Mountain Winery were collected during December 2011 and tested for clarification, using poly-DADMAC-sepiolite (NC), chitosan-sepiolite (NH) or poly-DADMAC-bentonite (NV) nanocomposites. FIGS. 12A-12C show average light intensity measured between 1 and 3 minutes each 10 seconds, through the upper part of a test tube, for WE with NC (FIG. 12A) or NH (FIG. 12B) nanocomposites added at a 1 g/L clay dose at different polymer/clay ratios. Centrifugation was performed at a centrifugal force equivalent to 5.2 g.

Light intensity through distilled water was about 94% whereas for untreated WE, only 22%. Efficiency of the clarification varied considerably: for NC samples the best effect was obtained at 50 mg poly-DADMAC per g sepiolite, whereas very high and very low polymer/clay ratios yielded light intensities similar to the raw effluents. NH samples behaved similarly, and even slightly better. More specifically, polymer/clay ratios of 40-60 mg chitosan per g sepiolite yielded light intensity of almost 80%. NV samples (FIG. 12C) were still very efficient, even though optimal values were slightly lower than those measured for NC and NH. Efficient clarification was observed, at higher polymer/clay ratio (130-165 mg poly-DADMAC per g bentonite).

All three nanocomposites yielded efficient clarification of WE at different polymer/clay ratios, however, for all three nanocomposites the efficient particles had a similar charge as measured by the PCD device mentioned in Example 5, of approximately 100-150 $mmol_c$ kg clay. This suggests that the main parameter for the sedimentation of WE effluents is the neutralization of the colloids. In the case of the OMW (Example 10) the efficient flocculants have completely different charge (5000 and 3500 mmol, kg clay for NC and NH, respectively), indicating that other interactions might play very important role in olive mill effluents.

Example 12

Coagoflocculation Process in Recreational Water

Coagoflocculation process was also tested in water from a recreational natural pond in Northern Israel. The pond is a small depression of 5000 $m^2$ and 2 m deep in the basalt layer, exposing aquifer water, that is open to the public as a scenic attraction including pedal boats, numerous birds, and several other animals (deer, sheep, alpacas, llamas, etc.) During peak seasons (weekends and holidays) it might host up to several hundred tourists each day. During spring and summer, water from this site was reported to contain large amount of algae and high photosynthetic activity, large amounts of nitrogen phosphate concentrations were well above eutrophic limits, allowing development of large algae populations.

Coagoflocculation tests were performed on recreational water of the source mentioned above, collected during the last week of May 2012, with nanocomposites ranging polymer/clay ratios between 0-500 chitosan/sepiolite or poly-DADMAC/sepiolite. Results analyzed using a LUMISizer dispersion analyzer led to the conclusion that the most efficient treatment may be performed using nanocomposites based on 200 mg chitosan per g sepiolite, added at a dose equivalent to 0.5 g clay/L. Influence of such proposed treatment on several environmental parameters 15 minutes after treatment is shown in Table 2. As can be observed, the coagoflocculation process removed completely the turbidity. An 80% reduction in TSS, 90% reduction in nitrate, and 60% reduction in phosphate were also observed. COD was reduced by only 20%, but as mentioned above-the main goal of the coagoflocculation process was the reduction of turbidity and suspended solids, which allowed following treatments to be more effective.

TABLE 2

Physicochemical parameters of recreational water upon addition of 0.05% of a 200 mg chitosan/g sepiolite coago-flocculant

| recreational water | turbidity NTU | TSS mg $l^{-1}$ | COD mg $l^{-1}$ | phosphate mg $l^{-1}$ | nitrate mg $l^{-1}$ |
|---|---|---|---|---|---|
| untreated | 353 ± 7.1 | 251 ± 23 | 74.4 ± 8.2 | 3.68 ± 0.03 | 21.2 ± 0.42 |
| treated after 15 minutes | 2.1 ± 0.8 | 47 ± 13 | 58.0 ± 6.9 | 1.42 ± 0.03 | 1.92 ± 0.04 |

Example 13

Relationship Between the Amount of Charge in Effluents and the Type and Dose of Coagulants/Flocculants in General and Nanocomposites in Particular An interesting relationship between the amount of charge in effluents and the type and dose of coagulants/flocculants in general and nanocomposites in particular is presented. Literature related to wastewater treatment describes clear relationship between zeta ($\zeta$) potential and colloidal stability, i.e., high absolute values of $\zeta$ potential are related to stable dispersion, whereas values close to zero are related to neutralization that yields coagulation and flocculation (Armenante, 1999; Amuda and Amoo, 2007). Zeta ($\zeta$) potential is defined as the electric potential difference between the shear plane of a colloidal particle and the bulk of the solution and is commonly employed in municipal water-treatment facilities to evaluate the flocculation potential (Evangelou, 1998). In some publications it is even stated that if the zeta potential is large, then more coagulants are needed. However, more detailed data show that even though stability is at the lowest in the vicinity of a point where the value of $\zeta$-potential is approximately equal to zero (±5 mV), it only can help in the choice of flocculants, but a definite valuation of its applicability can be given only after sedimentation or other suitable tests (Salopek et al., 1992).

Another electrokinetic technique is based on a streaming current detector (SCD), first introduced by Gerdes (1966). This technique, applied in a "particle charge detector" instrument is devised to measure the amount of electrokinetic surface charge directly by combining an electrokinetic probe with titration of a charge-compensating polyelectrolyte. The technique is relatively simple and requires no additional model assumptions (Bockenhoff and Fischer, 2001). The principle of charge indication is based on the generation of a streaming potential which is induced by the oscillating movement of a plunger in a polytetrafluoroethylene (PTFE) cell, while gold electrodes placed in the cell record the electrokinetic signal. The surface charge is then quantified by titration with charge compensating polyelectrolytes. Addition of the titration solution is performed across the point of zero charge, i.e., the point at which the electrokinetic surface charge is zero (Dultz and Rytwo, 2005).

It was found that a direct evaluation of the efficient type and dose of coagulants/flocculants in general, and nanocomposites particular can be made based on PCD measurements of the effluents and the neutralizing material. FIG. 13 and Table 3 show addition of nanocomposite based on S9 sepiolite and polyDADMAC at a 800 mg polymer $g^{-1}$ clay ratio, specifically NC21 2.5% suspension, to Mhrar OMW after bioreactor treatment. Those bioreactor treated effluents were still very rich in suspended solids (TSS-1600 mg $L^{-1}$, turbidity 973 NTU). The charge was tneasured as detailed above in [00116]. It can be seen that evaluation by measuring the charge of the effluents, and the charge of the nanocomposites suspension yields a straightforward evaluation of the volume of coagoflocculant to be added in order to achieve efficient clarification. In this case, based on the fact that the effluents contain −1900 µmole charges $L^{-1}$, and the NC21 2.5% suspension contains +89000 µmole charges $L^{-1}$, complete neutralization should be obtained by adding 21 ml coagoflocculant suspension per L effluent (equivalent to 533 ppm NC21 final concentration). Results in Table 3 and FIG. 13 show that indeed NC21 final concentration of 500 ppm yielded a 97% turbidity removal.

TABLE 3

Mhrar OMW (initial charge of −1900 µmole $L^{-1}$) treated with increasing amounts of NC21 2.5% nanocomposites suspension (initial charge of +89000 µmole $L^{-1}$).

| Concentration of added NC21 [ppm] | Volume of NC21 added ml $L^{-1}$ | Suspension turbidity NTU | Measured suspension charge | NC added charge µmole $L^{-1}$ | Evaluated remaining charge of Mhrar OMW |
|---|---|---|---|---|---|
| 0 | 0 | 973 | −1900 | 0 | −1900 |
| 100 | 4 | 305 | −1400 | 356 | −1544 |
| 200 | 8 | 146 | −1000 | 712 | −1188 |
| 300 | 12 | 88 | −650 | 1068 | −837 |
| 500 | 20 | 28 | −180 | 1780 | −120 |
| 750 | 30 | 120 | 450 | 2670 | 770 |
| 1000 | 40 | 278 | 1300 | 3560 | 1660 |

The same effect was observed in completely different effluents. A sample containing algae was tested for clarification. Charge of the untreated effluents was −900 µmole charges $L^{-1}$. Application of NC21 2.5% at different doses ranging from 0-400 µL nanocomposite suspension per 50 nil, of algae effluents (equivalent to 0-1400 µmole charges $L^{-1}$) shows that efficient clarification was obtained at an added volume of 50 µL nanocomposite (equivalent to +890 µmole charges $L^{-1}$). At lower or higher added amounts, less efficient effect was obtained. FIG. 14 shows results for algae effluents treated with increasing amounts of NC21 2.5% nanocomposites suspension, after 10 minutes of coagoflocculant addition (amounts as ml per 50 ml effluents).

In order to confirm the feasibility of the suggested practice, another test was performed: OMW after bioreactor treatment with an initial charge of −5400 mole charges $L^{-1}$ was treated with three different nanocomposites: (i) NH21 (800 mg chitosan per g sepiolite), (ii) NC19 (500 mg polyDADMAC per g sepiolite) and (iii) NC26 (2200 mg polyDADMAC per g sepiolite). All nanocomposites were prepared at a 2.5% suspension. FIG. 15 shows the charges and evaluated volumes needed to neutralize the effluents. Table 4 summarizes the charge of NE21, NC19 or NC26 and the calculated doses needed for the clarification of OMW.

TABLE 4

Calculated needed doses of nanocomposites for the clarification of OMW

| | Charge (mmole $L^{-1}$) | Needed volume of nanocomposite (ml $L^{-1}$) |
|---|---|---|
| raw OMW | 5.2 | |
| NH21 | 63.5 | 81.9 |
| NC19 | 124 | 41.6 |
| NC26 | 589 | 8.8 |

It can be seen that when added doses are dose to the calculated needed doses (8.8, 41.6 and 81.9 ml nanocomposite $L^{-1}$ effluent of NC26, NC19 or NH21, respectively), light transmission as measured by the dispersion analyser (see Example 6 herein above) was considerably higher than at the other doses, indicating an efficient clarification.

The use of charge measurement in order to evaluate suitable dose for efficient clarification is not limited to nanocomposites. FIG. 16 shows addition of 40%, 80% or 160% of the neutralization dose of NC26 5% suspension, of an alum sulphate commercial solution, or of raw polyDAD- MAC 10% solutions (990, 108 and 620 mmole$_c$ L$^{-1}$, respectively). It can be seen that in all three cases the best clarification after 1 minute centrifugation (black bars) was obtained at 80% neutralization, however, standard deviation at this time was very large. After 3 min (gray bars) samples with high additive amounts showed even better results for all three compounds. It is interesting to notice that NC26 delivered the best clarification, indicating a clear advantage of the use of nanocomposites above the other coagulants. Measurements performed after longer time reduced the differences, but even after 10 minutes (white bars) of centrifugation at 5 g acceleration (equivalent to 50 minutes at normal gravity) NC26 still yielded improved clarification with considerably higher transmission (63%) than poly-DADMAC (57%) or alum sulphate (52%).

Example 14

Pretreatment of Dairy and Cowshed Industry Effluents

Dairy and cowshed industry is one of the main sources of industrial wastewater generation (Demirel et al., 2005). Dairy wastewater (DW) contains milk solids, detergents, sensitizers and lubricants generated in packaging and distribution operations, and is considered together with other effluents from the food industry (as olive mill and winery wastewater) as a difficult agro-industrial effluent to treat (Dipu et al., 2010). Chemical oxygen demand (COD) values can reach 50000 mg L$^{-1}$, biochemical oxygen demand (BOD) values of up to 18000 mg L$^{-1}$ and total suspended solids (TSS) may reach 25000 mg L$^{-1}$. DW is known as a complicated pollutant in several countries and in some places it even flows unabated directly to streams contaminating water aquifers. Such effluents have been reported as possible cause of eutrophication in a few lakes and slow rivers. Any technology able to reduce the environmental impact and the health hazard of those effluents can make a substantial contribution by removing pollution from the environment and increasing the amount of water that can be reused for irrigation.

In order to test the feasibility of the application of nanocomposites for the reduction of TSS and turbidity in dairy effluents, charge of the effluents was measured as mentioned in Example 13, herein above. In contrast to most effluents measured until now, the charge of three dairy wastewater samples (two from Ramat Hagolan Dairy Farm, and one from Strauss Industry, Israel) had been found to be positively charged, ranging from +50 to +500 µmole$_c$ L$^{-1}$. In order to treat such effluents nanocomposites based on sepiolite S9 and the hydrophilic polymers poly(methyl vinyl ether-alt-maleic anhydride) medium molecular weight of formula II (CAS 9011-16-9, PMVE) or poly(acrylamide-co-acrylic acid) medium molecular weight of formula III (CAS 62649-23-4, PAM) were prepared in the same manner as described in Example I above, with polymer to clay ratios ranging from 20 to 500 mg polymer g$^{-1}$ clay.

These polymers tend to be anionic.

FIG. 17 shows a correlation between the charge and the polymer clay ratio for PMVE (◆) and for PAM-sepiolite (■) nanocomposites. It can be observed that negative charge increases with the amount of polymer added, indicating the clear negative influence of the polymer. Considering the molecular weight of one unit of 1:1 PMVE copolymer is 468.4 g/mole, and the slope is –3.57 mmole$_c$ g$^{-1}$ polymer (the linear equation is y=–3.5672x-116.55, R$^2$=0.9668), a charge percentage of 167% is derived, thus both subunits of the copolymer are at least partly charged.

FIG. 18 shows the clarification measured in Strauss Co. dairy wastewater as a result of the addition of 5 ml L$^{-1}$ PMVE-S9 nanocomposites 5% suspension (percentage based on the clay amount), at different polymer/clay ratios. Results were measured with the LUMisizer dispersion analyser mentioned above, after 2 min of centrifugation at 5 g, from the upper 70% of the test tube. The best clarification was obtained for 80 mg polymer per g clay. It is interesting to mention that the evaluation technique presented in the previous Example 13, fits approximately to this case too: the charge of Strauss dairy wastewater was about +250 µmole$_c$ L$^{-1}$, whereas the added charges for the best fit nanocomposite in FIG. 18 were about –200 µmole$_c$ L$^{-1}$.

14.1 Cowshed Effluents

Environmental problems caused by the large amount of wastewater related by livestock agriculture had been reported around the world. According to the Environmental Protection Agency, the pollution from animal feedlots to surface water and groundwater, is associated with a range of human health and ecological impacts and contributes to degradation of the US surface waters (Copeland, 2010). In Israel values of COD cowshed effluents range between 2000-12000 mg/L, whereas TSS range between 2000-5000 mg/L (Hilted Malka, 2013, personal communication). Those values are at least twice the allowed for disposal in wastewater treatment plants, and more than 20 folds the values determined by Inbar's Committee's Standards which restrict 37 parameters in the use of treated sewage water for irrigation due to considerations related to ground, plant, hydrology and health of the public (Israel Ministry of Environmental Protection, 2005).

FIG. 19 shows the clarification obtained in cowshed effluents at different polymer to clay ratios. The numbers on the test tubes indicate the polymer/clay ratio in mg PD/g S9, In a preliminary test performed on Ramat Hagolan cowshed effluents, with initial values of COD=5460 mg/L, TSS-4480 mg/L and turbidity of 1510 NTU, a 98% reduction of TSS and turbidity was measured 5 minutes after the application of 2.5 Inn of a 5% suspension of nanocomposites prepared with S9 and 240 mg PD/g clay.

A reduction above 97% in TSS and turbidity was observed. In this case also a 92% reduction in COD was measured, indicating that in this cowshed effluents sample most COD was a particulate, whereas in other effluents tested most COD was dissolved. In several other cowshed effluent samples COD reduction of 75-90% was measured, while in winery effluents, for example, only a reduction of 10-20% in COD was measured even though reduction in TSS and turbidity reached values >95%. This is of course an indication of the ratio between dissolved and particulate organic matter, varying considerably for each effluents' type.

Example 15

Coagoflocculation Process Based on a Mixture of a Nanocomposite and a Bridging Polymer One of the aspects that should be considered when using coagulation or flocculation processes is the need of separation of the sludge from the effluents. In some cases, spontaneous sedimentation concentrated the sludge in less than 5-10% of the volume. In such cases, pumping of the supernatant can be performed and, as shown in Example 9 above, 5-8 sequential additions of untreated effluents to the sediment still yielded very efficient clarification. However, in other cases (Rytwo et al., 2012b) sludge volume is too large, reaching sometimes even 80% of the total volume, and avoiding efficient spontaneous separation. In such cases a filtration/centrifugation step is needed. Filtration devices are considerable cheaper than centrifugation decanters, however, for such purpose the size of the flocs might be critical in order to allow efficient and fast process.

In order to allow fast filtration, the present invention provides an improvement that increases the size of the flocs yielding even faster sedimentation on one hand, and easy filtration on the other hand. This improvement is based on a combination of a nanocomposite with a bridging slightly charged polymer. This bridging polymer should be based on large branches with relatively separated charges. FIG. 21 is a schematic representation of such combined approach. To the colloidal charged effluents (panel A) very small amounts of a suspension containing clay-polymer nanocomposite mixed with and additional bridging polymer with the same charge of the nanocomposites (panel B) is added. The total charge of nanocornposites should be slightly lower than the charge of the effluent. Flocs (~50 nm) are formed essentially following the same process as in panel C. Several smaller flocs are bridged together by the bridging polymer to form larger aggregates (>100 µm, panel D) that can be easily filtered without slowing down the process, Cohesion forces limit the minimum pore size required in order to filter an aqueous suspension without adding additional mechanical pressure to approximately 50 µm. The larger the pores, obviously, the faster the filtration process, allowing a more continuous effluent treatment.

To prove the feasibility of the proposed process, OMW was treated with a suitable nanocomposite, a proposed bridging polymer, or a combination of the two. FIG. 22 shows the particle size distribution measured with a Mastersizer laser diffraction particle sizing instrument. Raw UMW (red-•) had a large fraction of the particles (21%) <1.0 µm, and only a small part (24%) >100 µm. By adding 0.4 ml $L^{-1}$ of a 5% nanocomposites suspension based on 2000 mg polyDADMAC per g S9 (NC, purple--), the smaller fraction was almost disappeared (only 2.1%<10 µm), but there were still 63%<100 µm, handicapping fast filtration. The bridging polymer (in this example—Zetag® 8848FS; BR, black • • • •) when added alone at a relatively large amount (2 ml $L^{-1}$ of a 2% commercial formulation containing 40% of an active ingredient (a.i.)) exhibited a bimodal distribution: very large flocs were formed, but small particles remained in large amounts (18.3%<10 µm). The combination of the nanocomposite and the bridging polymers yielded improved results, up to a ratio of 1:5 of NC:BR. Above this ratio, results remained unchanged. At added amounts of 0.4 NC and 0.8 BR (a ratio NC/BR 1:2; gray--) still 0.8% of the particles were <10 µm and 35% of the particles were <100 µm, but increasing the amount of BR to 1.2 ml $L^{-1}$ (a ratio NC/BR 1:3, red—) resulted in that the smallest particles were about 30 µm and less than 8% of the particles were <100 µm. At NC/BR ratios of 1:5 (0.4 NC+2.0 BR, purple—) very good results were observed: for all cases the smallest particles observed were >70 µm, less than 1% of the particles were <100 µm and less than 5% of the particles were <200 µm, allowing very efficient and fast filtration processes.

The combination of the nanocomposites with the bridging polymer increased also the velocity of the process. FIG. 23 demonstrates the efficiency of the combination between different 5% nanocomposite suspensions added at 5 ml OMW, with or without a dose of 15 ml $L^{-1}$ of 0.8% a.i. BR bridging polymer solution, 1 minute after addition of the coagoflocculant at a relative acceleration force of 5 g. It can be seen that BR alone did not clarify the OMW, but when added with NC yielded improved and very fast clarification. It should be emphasized that after 10 min the samples reached the same transmission with or without addition of BR. Thus, the main influence of the BR in addition to enlarging the flocs, is in speeding the process.

Another interesting insight of the combination of nanocomposites and bridging polymer can be observed in FIG. 24. It can be clearly observed that while the bridging polymer (BR) did not yield clarified effluents, it formed larger and better organized flocs when combined with NC. NC without BR, on the other hand, yielded very good clarification, but the floes observed at the bottom were small and could only be filtered using a 50 µm sieve. Thus, only the combination of nanocomposite and bridging polymer together yielded good clarification and well organized, firm and large flocs.

Example 16

Flocs Stability and Comparison with Regular Treatments

In order to compare the efficiency of the proposed treatment with regular treatments, and also to evaluate costs, three possible options were tested on cowshed effluents:
  (i) NC—Nanocomposites (NC16Z, based on 2.5% S9 sepiolite suspension, 240 mg commercial PD per g clay, and 0.4% w/w commercial Zetag® 8848FS by BASF® as a bridging polymer);
  (ii) AL—Alum sulfate (commercial 40% solution);
  (iii) FL—Commercial Poly-DADMAC (commercial FL45 by SNF®, 40% a.i.).

The first experiment aimed to obtain the optimal dose for each treatment. Several doses of the three different coagulants and flocculants were added to 10 ml effluents. Measurements were performed with a LUMisizer dispersion analyzer, at 200 RPM (equivalent to 5 g centrifugal acceleration). In order to measure the efficiency of the clarification, light transmission through the upper 70% of the test tube was measured after 30 and 150 s (equivalent to 2.5 and 7.5 min at normal gravity). FIG. 25 shows the transmission measured with a LUMisizer dispersion analyzer, at 200 RPM (equivalent to 5 g centrifugal acceleration). Raw cowshed effluents (cc) were treated with NC16Z nanocomposites (NC), aluminum sulfate (AL) or commercial poly-DADMAC (PD). Figures represent amount of coagulant added in mL/L, effluent. It can be seen that only NC treatment achieved clarification with low standard deviation at very short times (30 s, FIG. 25, white bars). The two additional treatments (AL or PD) yielded relatively good clarification (better for the alum, and mediocre results for the commercial PD) but only at longer sedimentation times (150 s, FIG. 25, black bars).

According to the results, the following optimal treatments were chosen for the next experiment: nanocomposites (NC) at 16 in mL/L, alum (AL) at 2.0 ml/L and commercial PD (FL) at 0.6 mL/L.

Table 5 shows the evaluated cost of the three chosen treatments. All cost evaluations were performed based on the retail cost in Israel of the raw materials for each treatment. It can be seen that all costs are of the same order of magnitude: the alum treatment is the cheapest whereas the proposed NC treatment is cheaper than commercial PD application at the efficient doses. The following step included addition of the chosen doses in 50 ml test tubes.

After mixing the coagulant with the effluents, and waiting for ten minutes to allow spontaneous sedimentation, turbidity of the cleared effluents was measured, FIGS. 26A-26B show comparative results for the clarification of cowshed effluents, before (26A) and after (26B) filtration through a 212 μm screen. As shown in Table 5, and FIG. 26A the supernatant of all three treatments achieved before filtration a >95% turbidity removal. Afterwards the treated samples were filtered through a 70 mesh (212 μm) screen. The more notable advantage of the nanocomposites use was observed at this stage (Table 5 and FIGS. 26A-26B): whereas the NC treatments yielded filtrated effluents with only 10 NTU of turbidity, the two other treatments formed only small and unstable flocs that were not stopped by the 212 μm screen, thus filtrated effluents contained very large amounts of suspended material. Only the use of a 50 μm filter could reduce turbidity in AL and PD treatments to approximately 100 NTU, however as mentioned above, such fine screen requires the use of pressure in order to make the effluents to pass through the screen.

TABLE 5

Comparative results for the clarification of cowshed effluents, before and after filtration through a 212 μm screen

|  | price €/m³ | before filtration turbidity (NTU) | after 212 μm filtration | | | |
| --- | --- | --- | --- | --- | --- | --- |
|  |  |  | turbidity (NTU) | TSS (mg/L) | VSS (mg/L) | COD (mg/L) |
| raw not filtered |  | 2200 |  | 4480 |  | 5463 |
| raw filtered |  |  | 1510 | 2900 | 1620 | 1520 |
| NC16Z 2.5%, 16 ml/L | 1.36 | 11 | 10 | 73 | 33 | 60 |
| Alum 40%, 2 ml/L | 1.00 | 19 | 1480 | 3630 | 1840 | 1790 |
| FL45-PD 40%, 0.6 ml/L | 1.73 | 44 | 807 | 3230 | 1880 | 1160 |

The experiment described above demonstrates that only the use of nanocomposites yields the formation of large and stable enough flocs that allows separation by simple filtration with a large pores screen. Considering the cost of the treatment is similar, the advantage of nanocomposites use is obvious. Similar results were obtained with all effluents tested in the above examples.

REFERENCES

Amuda O. S., Amoo I. A., (2007) Coagulation/flocculation process and sludge conditioning in beverage industrial wastewater treatment. Journal of Hazardous Materials 141: 778-783.

Armenante P. M., (1999) Coagulation and Flocculation. Industrial waste control: Physical and chemical treatment. CHE 865 course. New Jersey institute of Technology website, http://cpe.njit.edu/dlnotes/che685/cls07-1.pdf, visited 15 Aug. 2011.

Beall, G. W. (2003) The use of organo-clays in water treatment. Appl. Clay Sci, 24: 11-20.

Böckenhoff, K., Fischer, W. K. (2001), Determination of electrokinetic charge with a particle-charge detector, and its relationship to the total charge. Fresenius J Anal Chem. 371, 670-671.

Copeland C., (2008), Animal Waste and Water Quality: EPA Regulation of Concentrated Animal Feeding Operations (CAFOs) (Congressional Research Service, November 17), http://www.nationaiagiawcenter.org/assetsicrs/RL31851.pdf.

Demirel B., Yenigun O., and Onay TT., (2005). Anaerobic treatment of dairy wastewaters: a review Process Biochem. 40, 2583-2595.

Dipu, S., AniuA., Kumar, V., and Thanga, S. G., (2010). Phytoremediation of dairy effluent by constructed wetland technology using wetland macrophytes. Global Journal of Environmental Research, 4, 90-100.

Dultz, S. and Rytwo, G., (2005) Effects of different organic cations on the electrokinetic surface charge from organo-montmorillonites—consequences for the adsorption properties. "Clays of Geotechnical and Economical Interest." Swiss, Austrian and German Clay Group—DTTG Annual Meeting. Celle, Germany, Oct. 5-8, 2005, DTTG Reports 11, 6-14.

Evangelou, V. P. (1998) Environmental Soil and Water Chemistry. John Wiley & Sons, Inc., New York, USA, p. 374.Ganigar, R. Rytwo, G. Gonen, Y. Radian, A. and Mishael, Y. G. (2010) Polymer-clay mineral nanocomposites for the removal of trichlorophenol and trinitrophenol from water. Applied Clay Sciences, 49: 311-316.

Gerdes, W. F., (1966): A new instrument—the streaming current detector. 12$^{th}$ National Analysis Instrument Symposium, Houston, Tex., USA.

Gonen and Rytwo, (2006). Using the dual-mode model to describe adsorption of organic pollutants onto an organoclay. J Colloid Interface Sci. 299(1):95-101.

Homeyer A. Von, Krentz D. O., Kulicke W. M., and Lerche D., (1999), Optimization of the polyelectrolyte dosage for dewatering sewage sludge suspensions by means of a new centrifugation analyser with an optoelectronic sensor, Colloid & Polymer Science, vol. 277, no. 7, pp. 637-645.

Israeli Ministry of Environmental Protection. (2005), Inhar's Standards for Waste-water Quality, http://www.s-viva.gov.il/Enviroment/Static/Binaries/Articalsltavia_inbar_1.pdf revisited Aug. 30, 2011 (in Hebrew)

Lerche, D. (2002) Dispersion stability and panicle characterization by sedimentation kinetics in a centrifugal field, J. Dispers. Sci. Technol, 23, 699-709.

Mousavi S. M., (2006) Use of modified bentonite for phenolic adsorption in treatment of olive oil mill wastewater. Iranian Journal of Science & Technology, Transaction B, Engineering, 30, No. B5, Ruiz-Hitzky, E. (2001). Molecular access to intracrystalline tunnels of sepiolite, J. Mater. Chem. 11, 86-91.

Rytwo, G. and Gonen, Y. (2006). Very fast sorbent for organic dyes and pollutants, Colloid and Polymer Science, 284: 817-820.

Rytwo, G. Kohavi, Y. Botnick, I. and Gotten, Y. (2007). Use of CV- and TPP-motmorillonite for the removal of priority pollutants from water. Applied Clay Science, 36: 182-190.

Rytwo, G. Rettig, A. and Gonen, Y. (2011). Organo-sepiolite particles for efficient pretreatment of organic wastewater: application to winery effluents. Applied Clay Sciences, 51: 390-394.

Rytwo. G., (2012a). The use of clay-polymer nanocomposites in wastewater pretreatment. The Scientific World Journal, 2012, Article ID 498503, 7 pages. doi: 10.1100/2012/498503.

Rytwo, G., Lavi, R., and König, I. N., (2012b) Influence of Freezing OMW on its pretreatment. Olive Oil Wastes and Environmental Protection Symposium, Chania Greece, 2012.

Rytwo, G., Lavi, R., Rytwo, Y., Monchase, H., Dultz, S., König, T. N., (2013). Clarification of olive mill and winery wastewater by means of clay polymer nanocomposites. Science of the Total Environment, 442, 134-142.

Salopek, B., Krasić, D., Filipović, S. (1992). Measurement and application of zeta-potential, Rudarsko-Geološko-Naftni Zbornik (ISSN 0353-4529), Vol. 4: 147-151.

von Homeyer, A., D. Krentz, W. Kulicke and D. Lerche. (1999) Optimization of the polyelectrolyte dosage for dewatering sewage sludge suspensions by means of a new centrifugation analyser with an optoelectronic sensor. Colloid & Polymer Science 277:637-6.45

The invention claimed is:

1. A method for pretreatment of wastewater for reduction of total suspended solids (TSS), chemical oxygen demand (COD) and turbidity, wherein the wastewater is from olive oil mills, wineries, piggeries, cowsheds, dairy effluents, slaughterhouses, fruit and vegetable processing industry, or soy or coffee bean industry, and includes charged colloidal particles suspended therein, said method consisting of treating the wastewater in one single step, wherein said single treatment step comprises treating the wastewater with a nanocomposite consisting of an anchoring particle and one or more polymers, at least one of said polymers being a polyelectrolyte polymer, whereby neutralization of the charged colloidal particles suspended in said wastewater occurs while bridging between charged colloidal particles and anchoring the charged colloidal particles to the anchoring particles, thus enhancing their aggregation and precipitation and achieving a reduction of TSS and turbidity in a time within the range of minutes to tens of minutes.

2. The method according to claim 1, wherein the anchoring particle is selected from the group consisting of clay minerals, zeolites, diatomaceous earth and powdered activated carbon.

3. The method according to claim 1, wherein the anchoring particle is a clay mineral.

4. The method according to claim 3, wherein said clay mineral is an aluminium or magnesium phyllosilicate selected from the group consisting of sepiolite, palygorskite, smectite, montmorillonite, hectorite, laponite, bentonite, and saponite.

5. The method according to claim 4, wherein the clay mineral is sepiolite or bentonite.

6. The method according to claim 1, wherein the nanocomposite consists of an anchoring particle and one, two or three polymers, one of which is a polyelectrolyte polymer.

7. The method according to claim 6, wherein the polyelectrolyte polymer is a polycationic polymer.

8. The method according to claim 7, wherein said polycationic polymer is selected from the group consisting of: (i) a linear water-soluble polymer selected from the group consisting of poly(diallyl dimethylammonium) chloride (poly-DADMAC) and cationic polyacrylamide; (ii) a polyquaternium selected from the group consisting of quaternized hydroxyethylcellulose ethoxylate and poly [(2-ethyl-dimethylammonioethyl methacrylate ethyl sulfate)-co-(1-vinylpyrrolidone)]; (iii) cationic biopolymers selected from the group consisting of cationic guar gum and chitosan; and (iv) polymers with aromatic rings including poly-4-vinylpyridine-co-styrene.

9. The method according to claim 8, wherein the polycationic polymer is poly-DADMAC or chitosan.

10. The method according to claim 6, wherein the polyelectrolyte polymer is a polyanionic polymer.

11. The method according to claim 10, wherein said polyanionic polymer is a poly(methyl vinyl ether-alt-maleic anhydride) (PMVE) or a poly(acrylamide-co-acrylic acid) (PAM) copolymer.

12. The method according to claim 1, wherein at least one of said one or more polymers is a non-ionic polymer.

13. The method according to claim 12, wherein the non-ionic polymer is selected from the group consisting of polyethylene glycol, cellulose ether, polyvinyl alcohol, polyvinylpyrrolidone, and copolymers containing aromatic units.

14. The method according to claim 1, wherein said anchoring particle is a clay mineral and said at least one polyelectrolyte polymer is a polycationic polymer.

15. The method according to claim 14, wherein said clay mineral is sepiolite or bentonite and said polycationic polymer is poly-DADMAC or chitosan.

16. The method according to claim 15, wherein the nanocomposite is selected from the group consisting of: (i) poly-DADMAC-sepiolite; (ii) poly-DADMAC-bentonite; and (iii) chitosan-sepiolite.

17. The method according to claim 16, wherein: (i) the quantitative ratio between poly-DADMAC and sepiolite in the poly-DADMAC-sepiolite nanocomposite is within the ranges selected from the group consisting of 3 to 3000 mg/g, 30 to 2400 mg/g, 80 to 1800 mg/g, and 500 to 1000 mg/g; (ii) the quantitative ratio between poly-DADMAC and bentonite in the poly-DADMAC-bentonite nanocomposite is within the ranges selected from the group consisting of 3 to 500 mg/g, 30 to 490 mg/g, and 130 to 165 mg/g; and (iii) the quantitative ratio between chitosan and sepiolite in the chitosan-sepiolite nanocomposite is within the ranges selected from the group consisting of 3 to 1200 mg/g, 120 to 1000 mg/g, and 500 to 800 mg/g.

18. The method according to claim 1, wherein said anchoring particle is a clay mineral and said at least one polyelectrolyte polymer is a polyanionic polymer.

19. The method according to claim 18, wherein said clay mineral is sepiolite and said polyanionic polymer is PMVE or PAM copolymer.

20. The method according to claim 19, wherein said nanocompo site is PAM-sepiolite, or PMVE-sepiolite.

21. The method according to claim 20, wherein (i) the quantitative ratio between PMVE copolymer and sepiolite in the PMVE-sepiolite nanocomposite is within the ranges selected from the group consisting of: 20 to 500 mg/g, 40 to 320 mg/g, and 60 to 100 mg/g; or (ii) the quantitative ratio between PAM copolymer and sepiolite in the PAM-sepiolite nanocomposite is within ranges selected from the group consisting of: 20 to 500 mg/g, 100 to 400 mg/g, and 200 to 300 mg/g.

22. The method according to claim 1, wherein said reduction of TSS and turbidity is a reduction of two orders of magnitude.

23. The method according to claim 1, wherein said reduction of TSS and turbidity is a reduction of >90%.

* * * * *